United States Patent
Rusert

(10) Patent No.: US 10,805,605 B2
(45) Date of Patent: *Oct. 13, 2020

(54) MULTI-LAYER VIDEO STREAM ENCODING AND DECODING

(71) Applicant: Telefonaktiebolaget L M Ericsson (publ), Stockholm (SE)

(72) Inventor: Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 671 days.

This patent is subject to a terminal disclaimer.

(21) Appl. No.: 13/977,936

(22) PCT Filed: Jun. 11, 2013

(86) PCT No.: PCT/SE2013/050670
§ 371 (c)(1),
(2) Date: Jul. 2, 2013

(87) PCT Pub. No.: WO2014/098703
PCT Pub. Date: Jun. 26, 2014

(65) Prior Publication Data
US 2014/0177718 A1  Jun. 26, 2014

Related U.S. Application Data

(60) Provisional application No. 61/740,562, filed on Dec. 21, 2012.

(51) Int. Cl.
*H04N 19/105* (2014.01)
*H04N 19/187* (2014.01)
(Continued)

(52) U.S. Cl.
CPC ......... *H04N 19/105* (2014.11); *H04N 19/187* (2014.11); *H04N 19/30* (2014.11); *H04N 19/70* (2014.11)

(58) Field of Classification Search
CPC .......... H04N 19/00769; H04N 19/105; H04N 19/187; H04N 19/30; H04N 19/70;
(Continued)

(56) References Cited

U.S. PATENT DOCUMENTS 8,363,732 B2 *  1/2013  Jeon ..................... H04N 19/597
                                                    375/240.12
8,532,178 B2 *  9/2013  Koo ...................... H04N 19/597
                                                    375/240.12
(Continued)

OTHER PUBLICATIONS

U.S. Appl. No. 61/728,997 of US 20140140414.*
(Continued)

*Primary Examiner* — Mohammed Jebari
(74) *Attorney, Agent, or Firm* — Murphy Bilak & Homiller, PLLC

(57) ABSTRACT

Multi-layer dependencies are signaled in an efficient way for a multi-view video stream (1). Coding or decoding relationship information defining coding or decoding dependencies is represented in bit-efficient syntax code, preferably through usage of hierarchical layer dependencies using layer indices for representing layer dependencies.

5 Claims, 10 Drawing Sheets

(51) Int. Cl.
*H04N 19/70* (2014.01)
*H04N 19/30* (2014.01)

(58) Field of Classification Search
CPC ...... H04N 7/50; H04N 7/26244; H04N 5/145; H04N 7/26765; H04N 7/26015
See application file for complete search history.

(56) References Cited

U.S. PATENT DOCUMENTS

| | | |
|---|---|---|
| 2006/0256851 A1 | 11/2006 | Wang et al. |
| 2009/0323824 A1 | 12/2009 | Pandit et al. |
| 2010/0020871 A1* | 1/2010 | Hannuksela ......... H04N 21/438 375/240.12 |
| 2010/0161823 A1* | 6/2010 | Jung ............. H04N 21/234327 709/231 |
| 2012/0062756 A1* | 3/2012 | Tian .................... H04N 19/008 348/218.1 |
| 2012/0075436 A1* | 3/2012 | Chen ................... H04N 19/597 348/51 |
| 2012/0183076 A1* | 7/2012 | Boyce ................. H04N 19/105 375/240.25 |
| 2012/0230431 A1* | 9/2012 | Boyce ................... H04N 19/30 375/240.25 |
| 2013/0195370 A1* | 8/2013 | Sasai ..................... H04N 19/70 382/233 |
| 2013/0235152 A1* | 9/2013 | Hannuksela ..... H04N 19/00769 348/43 |
| 2014/0003528 A1* | 1/2014 | Tourapis .......... H04N 19/00424 375/240.16 |
| 2014/0140398 A1* | 5/2014 | Deshpande ............ H04N 19/30 375/240.12 |
| 2014/0140414 A1* | 5/2014 | Deshpande .......... H04N 19/597 375/240.25 |
| 2015/0208092 A1* | 7/2015 | Lee ...................... H04N 19/105 375/240.12 |
| 2015/0256838 A1* | 9/2015 | Deshpande ............ H04N 19/70 375/240.02 |

OTHER PUBLICATIONS

Tech, Gerhard et al. "MV-HEVC Working Draft 1." Joint Collaborative Team on 3D Video Coding Extension Development of ITU-T SG WP 3 and ISO-IEC JTV 1/SC 29/WG 11, Jul. 16-20, 2012. Stockholm.

Boyce, J. et al. "NAL unit header and parameter set designs for HEVC extensions." Joint Collaborative Team on Video Coding (JCT-VC) of ITU-T SG 16 WP 3 and ISO/IEC JTC 1/SC 29/WG 11, JCTVC-K1007, 11th Meeting, Oct. 10-19, 2012, pp. 1-8, Shanghai, China.

Boyce, Jill, et al., "NAL unit header and parameter set designs for HEVC extensions", Joint Collaborative Team on 3D Video Coding Extension Development of ITU-T SG 16 WP 3 and ISO/IEC JTC 1/SC 29/WG 11, JCT3V-B1007, 2nd Meeting: Shanghai, CN, Oct. 13-19, 2012, pp. 1-8.

* cited by examiner

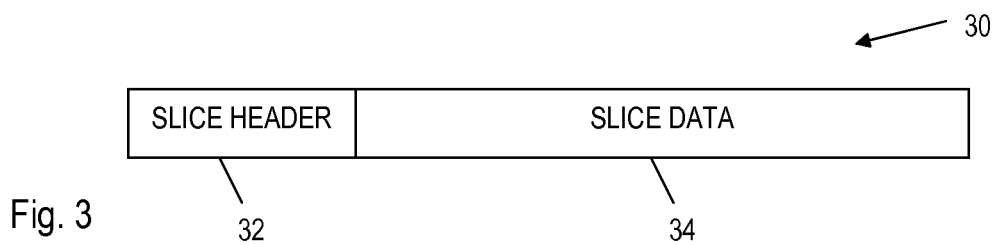
Fig. 3
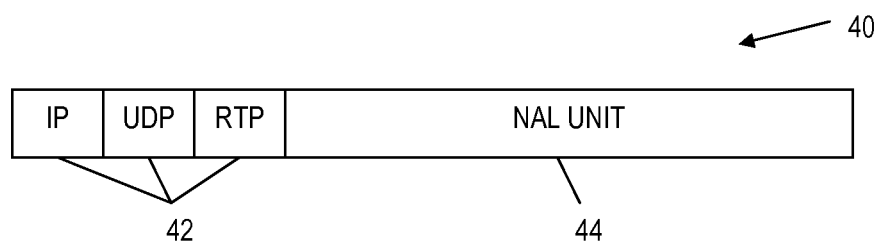
Fig. 4
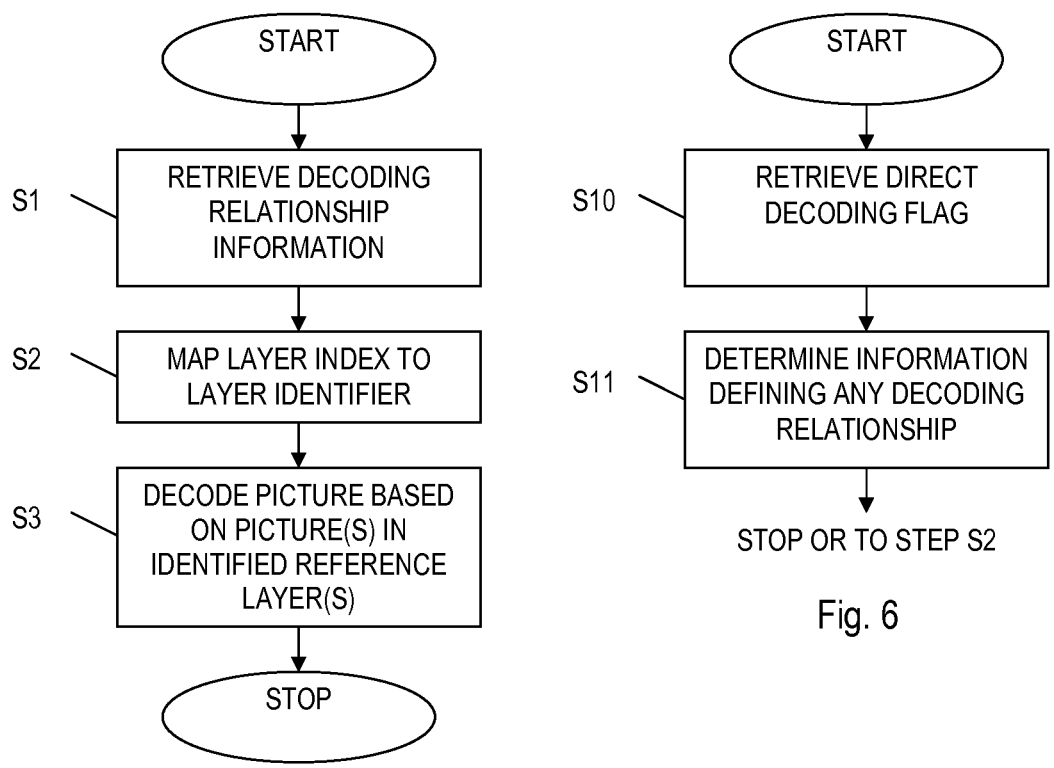
Fig. 5
Fig. 6

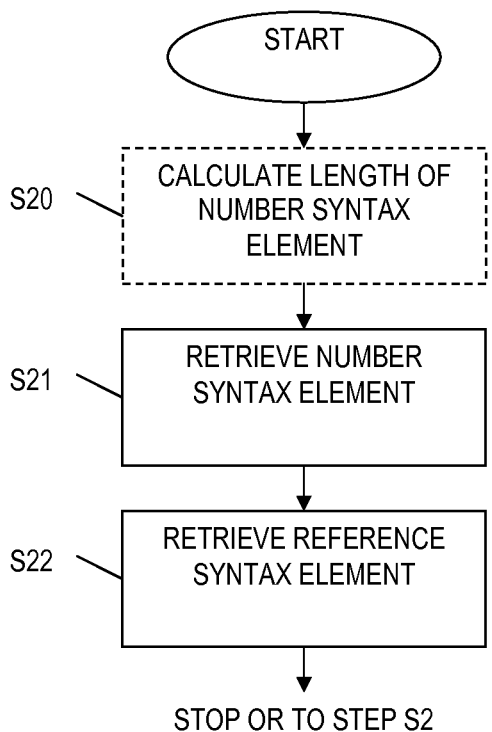
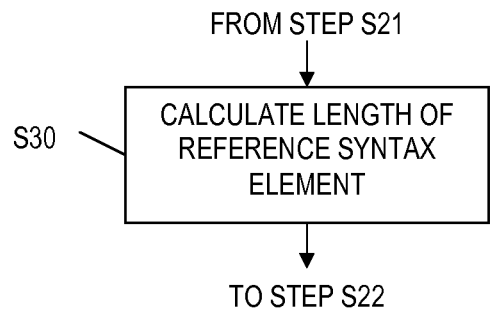
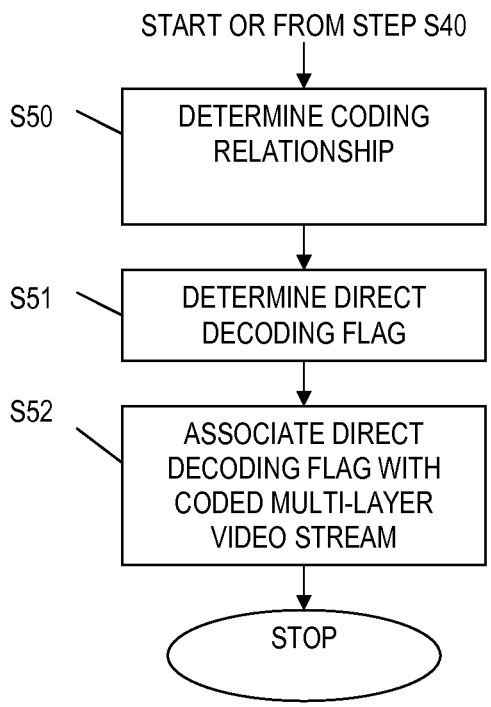
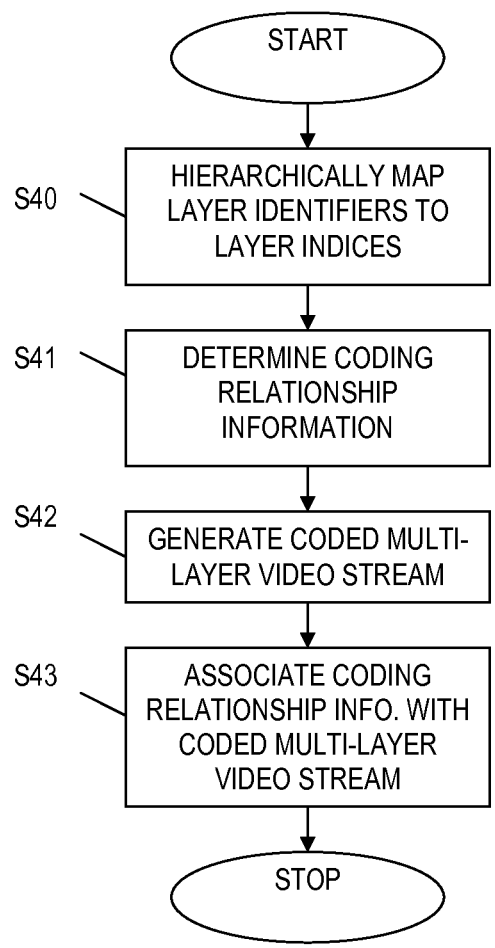

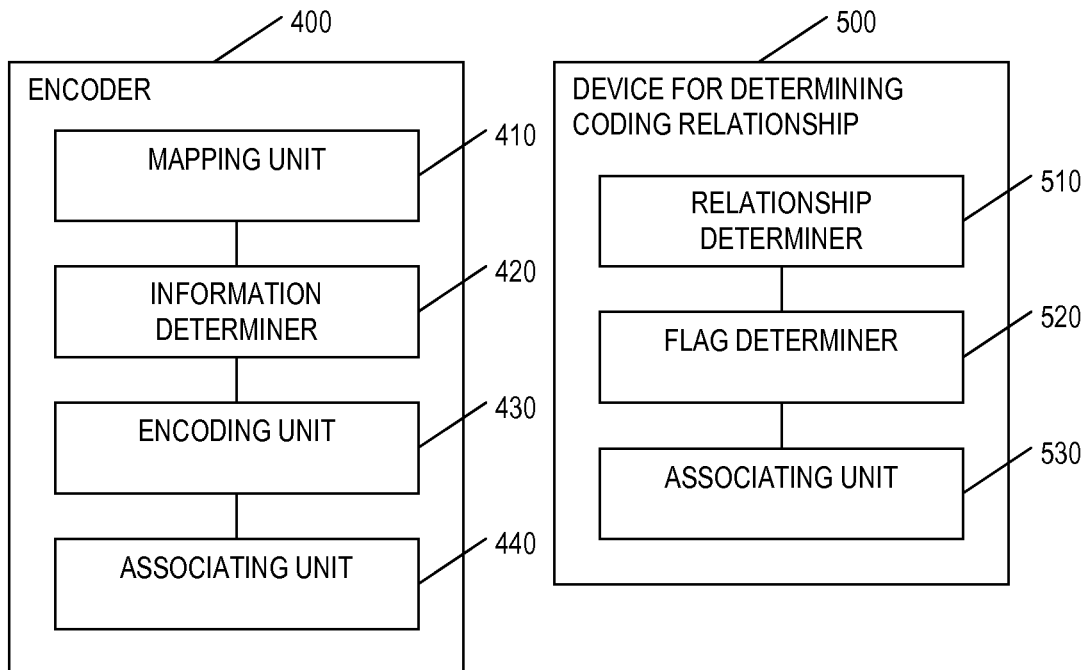
Fig. 15
Fig. 16
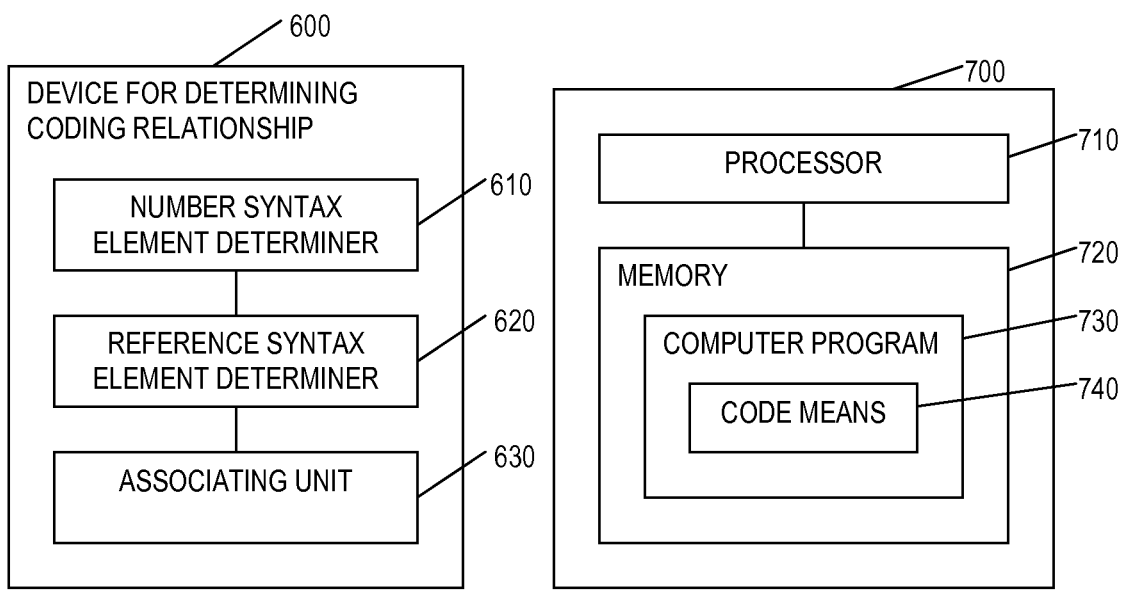
Fig. 17
Fig. 18

MULTI-LAYER VIDEO STREAM ENCODING AND DECODING

TECHNICAL FIELD

The embodiments generally relate to processing of a multi-layer video stream, and in particular to decoding and encoding of such a multi-layer video stream.

BACKGROUND

HEVC (High Efficiency Video Coding) is the next generation video coding standard that is currently under development in standardization. HEVC will substantially improve coding efficiency compared to the state-of-the-art H.264/Advanced Video Coding (AVC). The initial focus of the HEVC development was on mono video, i.e. one camera view, at a fixed quality and bit rate, i.e. non-scalable. Now multi-layer extensions to the HEVC standard are under preparation, e.g. a scalable extension, a multi-view extension, and a 3D extension. Those extensions require multi-layer support. A HEVC bitstream without extensions can be considered as a single-layer bitstream, i.e. it represents the video in a single representation, e.g. a single video view, a single resolution and a single quality. In multi-layer extensions, a HEVC single-layer bitstream is typically included as a "base layer". In multi-view or 3D extensions, additional layers may represent additional video views captured from different camera positions or, for instance, depth information. In scalability extensions, additional layers may represent the video in additional, typically higher, video picture resolutions, or higher pixel fidelity, or other color-spaces, or alike, providing improved video quality relative to the base layer.

Specific decoders are used to decode HEVC bitstreams with multiple layers, i.e. scalable or multi-view/3D HEVC decoders. In order to decode multi-layer bitstreams, information about decoding dependencies between layers is necessary. This information needs to be signaled in the bitstream. The information can also be used by network elements to identify layers that can be discarded from the transmission if bit rate adaptation, e.g. in case of network congestion, or format adaptation, e.g. in case a target device can only decode or display a certain maximum resolution, or 2D/3D adaptation, e.g. in case target device can only decode or display a certain number of views, is needed.

The dependency information in HEVC is typically obtained in so-called parameter sets, such as Picture Parameter Set (PPS), Sequence Parameter Set (SPS), or Video Parameter Set (VPS), together with other information. Typically, each parameter set is encapsulated in a Network Abstraction Layer (NAL) unit, i.e. a packet in the video bitstream. Since parameter sets contain information that is essential for decoding, they may be sent repeatedly in the bitstream, or be conveyed by "out-of-band" transmission, i.e. transmitted separately from the remaining bitstream, e.g. over a reliable connection. Such an out-of-band transmission can occur, for instance during session setup, e.g. using Session Description Protocol (SDP).

If parameter sets are sent at session start-up, the amount of data in the parameter set has an impact on the transmission duration and thus session start-up time. If parameter sets are sent "in-band", i.e. in the bitstream, the size of parameter sets has an impact on the overall bitrate, and the impact is higher when the parameter sets are repeated in the bitstream for error resiliency reasons. For these reasons it is important that the information conveyed in the parameter sets is expressed in a compact way.

A document Joint Collaborative Team on Video Coding (JCT-VC) of ITU-T SG 16 WP 3 and ISO/IEC JTC 1/SC 29/WG 11 at $11^{th}$ Meeting: Shanghai, CN, 10-19 Oct. 2012 denoted JCTVC-K1007 relating to NAL unit header and parameter set designs for HEVC extensions includes specifications of parameter set designs for HEVC multi-view/3D and scalable coding extensions. According to that document, layer dependencies are signaled as part of the vps_extension syntax structure as indicated below:

| vps_extension( ) { | Descriptor |
|---|---|
| ... | |
| for( i = 1; i ≤ vps_max_layers_minus1; i++ ) { | |
| //layer dependency | |
| num_direct_ref_layers[ i ] | u(6) |
| for( j = 0; j < num_direct_ref_layers[ i ]; j++ ) | |
| ref_layer_id[ i ][ j ] | u(6) |
| } | |
| } | | num_direct_ref_layers[ i ] specifies the number of layers the i-th layer directly depends on.
ref_layer_id[ i ][ j ] identifies the j-th layer the i-th layer directly depends on.

The above mentioned solution requires many bits to signal the layer dependencies in the VPS. In particular, for each layer above the base layer in use, six bits are used to code the number of reference layers and another six bits are used to identify each reference layer. This allows signaling dependencies for relevant cases, however it may be inefficient in terms of bit usage.

SUMMARY

It is a general objective to provide an efficient processing of a multi-layer video stream.

It is a particular objective to signal layer dependencies in an efficient way for a multi-layer video stream.

These and other objectives are met by embodiments disclosed herein.

An aspect of the embodiments relates to a method of determining decoding relationship for a coded multi-layer video stream defining multiple layers of pictures. The method comprises retrieving, based on the coded multi-layer video stream, at least one direct decoding flag indicating a direct coding relationship between a layer with layer index i of the multiple layers and a layer with layer index j of the multiple layers, i≠j. The method also comprises determining information defining any decoding relationship between the multiple layers based on the at least one direct decoding flag.

In an embodiment of this aspect the retrieving step comprises retrieving, for the layer with layer index i, a respective direct dependency flag for each layer index j based on the coded multi-layer video stream. In this embodiment, j<i and the direct dependency flag indicates whether the layer with layer index j is a direct reference layer for the layer with layer index i. In this embodiment the determining step comprises determining information defining any layer with layer index j<i, on which the layer with layer index i depends, based on the direct dependency flags.

In an embodiment of this aspect the retrieving step comprises retrieving, from a video parameter set or video parameter set extension associated with the coded multi-layer video stream, the at least one direct decoding flag indicating the direct coding relationship between the layer with layer index i and the layer with layer index j.

A related aspect of the embodiments defines a device for determining decoding relationship for a coded multi-layer video stream defining multiple layers of pictures. The device comprises a flag retriever configured to retrieve, based on the coded multi-layer video stream, at least one direct decoding flag indicating a direct coding relationship between a layer with layer index i of the multiple layers and a layer with layer index j of the multiple layers, i≠j. The device also comprises an information determiner configured to determine information defining any decoding relationship between the multiple layers based on the at least one direct decoding flag.

In an embodiment of this related aspect the flag retriever is configured to retrieve, for the layer with layer index i, a respective direct dependency flag for each layer index j based on the coded multi-layer video stream. In this embodiment, j<i and the direct dependency flag indicates whether the layer with layer index j is a direct reference layer for the layer with layer index i. In this embodiment the information determiner is configured to determine information defining any layer with layer index j<i, on which the layer with layer index i depends, based on the direct dependency flags.

In an embodiment of this related aspect the flag retriever is configured to retrieve, from a video parameter set or video parameter set extension associated with the coded multi-layer video stream, the at least one direct decoding flag indicating the direct coding relationship between the layer with layer index i and the layer with layer index j.

A variant of this related aspect of the embodiments defines a device for determining decoding relationship for a coded multi-layer video stream defining multiple layers of pictures. The device comprises a processor configured to process code means of a computer program stored in a computer readable medium. The code means causes, when run on the processor, the processor to retrieve, based on the coded multi-layer video stream, at least one direct decoding flag indicating a direct coding relationship between a layer with layer index i of the multiple layers and a layer with layer index j of the multiple layers, i≠j. The code means also causes the processor to determine information defining any decoding relationship between the multiple layers based on the at least one direct decoding flag.

Another aspect of the embodiments relates to a method of decoding a coded multi-layer video stream defining multiple layers of pictures, each layer of the multiple layers having a respective layer identifier. The method comprises retrieving, for a layer with a layer index of the multiple layers, decoding relationship information based on the coded multi-layer video stream. The decoding relationship information defines a respective layer index of any reference layer of the multiple layers, on which the layer directly depends. The method also comprises mapping, for each reference layer and for the layer, its layer index to a layer identifier based on mapping information of a hierarchical mapping relationship between layer identifiers and layer indices. The mapping information is retrieved based on the coded multi-layer video stream. The method further comprises decoding a picture of the layer based on at least one previously decoded picture in a layer of the multiple layers identified based on the layer identifiers mapped from layer indices.

In an embodiment of this another aspect the retrieving step comprises retrieving, based on the coded multi-layer video stream, at least one direct decoding flag indicating a direct coding relationship between a layer with layer index i of the multiple layers and a layer with layer index j of the multiple layers, i≠j. The retrieving step also comprises, in this embodiment, determining the decoding relationship information based on the at least one direct decoding flag.

In an embodiment of this another aspect the mapping step comprises retrieving a flag vps_nuh_layer_id_present_flag based on the coded multi-layer video stream. The mapping step also comprises setting, for each reference layer and for the layer and if vps_nuh_layer_id_present_flag=0, its layer identifier equal to its layer index. The mapping step further comprises retrieving, for each reference layer and for the layer and if vps_nuh_layer_id_present_flag=1, its layer identifier from a vector layer_id_in_nuh[i], i∈[1, vps_max_layers_minus1], wherein vps_max_layers_minus1+1 indicates a maximum number of layers and layer_id_in_nuh[i] indicates a layer identifier for a layer with layer index i.

Another related aspect of the embodiments defines a decoder configured to decode a coded multi-layer video stream defining multiple layers of pictures, each layer of the multiple layers having a respective layer identifier. The decoder comprises a decoding relationship information retriever configured to retrieve, for a layer with a layer index of the multiple layers, decoding relationship information based on the coded multi-layer video stream. The decoding relationship information defines a respective layer index of any reference layer of the multiple layers, on which the layer directly depends. An index-to-identifier mapping unit is configured to map, for each reference layer and for the layer, its layer index to a layer identifier based on mapping information of a hierarchical mapping relationship between layer identifiers and layer indices. The mapping information is retrieved based on the coded multi-layer video stream. The decoder further comprises a decoding unit configured to decode a picture of the layer based on at least one previously decoded picture in a layer of the multiple layers identified based on the layer identifiers mapped from layer indices.

In an embodiment of this another related aspect the decoding relationship information retriever comprises a flag retriever configured to retrieve, based on the coded multi-layer video stream, at least one direct decoding flag indicating a direct coding relationship between a layer with layer index i of the multiple layers and a layer with layer index j of the multiple layers, i≠j. The decoding relationship information retriever also comprises, in this embodiment, an information determiner configured to determine the decoding relationship information based on the at least one direct decoding flag.

In an embodiment of this another related aspect the index-to-identifier mapping unit is configured to retrieve a flag vps_nuh_layer_id_present_flag based on the coded multi-layer video stream. The index-to-identifier mapping unit is also configured to set, for each reference layer and for the layer and if vps_nuh_layer_id_present_flag=0, its layer identifier equal to its layer index. The index-to-identifier mapping unit is further configured to retrieve, for each reference layer and for the layer and if vps_nuh_layer_id_present_flag=1, its layer identifier from a vector layer_id_in_nuh[i], i∈[1, vps_max_layers_minus1], wherein vps_max_layers_minus1+1 indicates a maximum number of layers and layer_id_in_nuh[i] indicates a layer identifier for a layer with layer index i.

A variant of this another related aspect of the embodiments defines a decoder configured to decode a coded multi-layer video stream defining multiple layers of pictures, each layer of the multiple layers having a respective layer identifier. The decoder comprises a processor configured to process code means of a computer program stored in a computer readable medium. The code means causes, when run on the processor, the processor to retrieve, for a layer with a layer index of the multiple layers, decoding relationship information based on the coded multi-layer video stream. The decoding relationship information defines a respective layer index of any reference layer of the multiple layers, on which the layer directly depends. The code means also causes the processor to map, for each reference layer and for the layer, its layer index to a layer identifier based on mapping information of a hierarchical mapping relationship between layer identifiers and layer indices. The mapping information is retrieved based on the coded multi-layer video stream. The code means further causes the processor to decode a picture of the layer based on at least one previously decoded picture in a layer of the multiple layers identified based on the layer identifiers mapped from layer indices.

A further aspect of the embodiments relates to a method of determining coding relationship for a multi-layer video stream defining multiple layers of pictures. The method comprises determining any coding relationship between the multiple layers. The method also comprises determining, for a layer with layer index i of the multiple layers and based on the coding relationship, at least one direct decoding flag indicating a direct coding relationship between the layer with layer index i and a layer with layer index j of the multiple layers, i≠j. The method further comprises associating the at least one direct decoding flag with a coded representation of the multi-layer video stream.

A further related aspect of the embodiments defines a device for determining coding relationship for a multi-layer video stream defining multiple layers of pictures. The device comprises a relationship determiner configured to determine any coding relationship between the multiple layers. The device also comprises a flag determiner configured to determine, for a layer with layer index i of the multiple layers and based on the coding relationship, at least one direct decoding flag indicating a direct coding relationship between the layer with layer index i and a layer with layer index j of the multiple layers, i≠j. The device further comprises an associating unit configured to associate the at least one direct decoding flag with a coded representation of the multi-layer video stream.

A variant of this further related aspect of the embodiments defines a device for determining coding relationship for a multi-layer video stream defining multiple layers of pictures. The device comprises a processor configured to process code means of a computer program stored in a computer readable medium. The code means causes, when run on the processor, the processor to determine any coding relationship between the multiple layers. The code means also causes the processor to determine, for a layer with layer index i of the multiple layers and based on the coding relationship, at least one direct decoding flag indicating a direct coding relationship between the layer with layer index i and a layer with layer index j of the multiple layers, i≠j. The code means further causes the processor to associate the at least one direct decoding flag with a coded representation of the multi-layer video stream.

Yet another aspect of the embodiments relates to a method of encoding a multi-layer video stream defining multiple layers of pictures, each layer of the multiple layers having a respective layer identifier. The method comprises hierarchically mapping, for each layer of the multiple layers, a layer identifier of the layer to a layer index based on coding dependencies between the multiple layers. The method also comprises determining coding relationship information defining a respective layer index of any reference layer of the multiple layers, on which a layer of the multiple layers directly depends. The method further comprises generating a coded multi-layer video stream by encoding the pictures of the multiple layers based on the coding dependencies and associating the coding relationship information with the coded multi-layer video stream.

In an embodiment of this another aspect the determining step comprises determining any coding relationship between the multiple layers, and determining, for a layer with layer index i of the multiple layers and based on the coding relationship, at least one direct decoding flag indicating a direct coding relationship between the layer with layer index i and a layer with layer index j of the multiple layers, i≠j. The associating step comprises, in this embodiment, associating the at least one direct decoding flag with the coded multi-layer video stream.

Yet another related aspect of the embodiments defines an encoder configured to encode a multi-layer video stream defining multiple layers of pictures, each layer of the multiple layers having a respective layer identifier. The encoder comprises a mapping unit configured to hierarchically map, for each layer of the multiple layers, a layer identifier of the layer to a layer index based on coding dependencies between the multiple layers. The encoder also comprises an information determiner configured to determine coding relationship information defining a respective layer index of any reference layer of the multiple layers, on which a layer of the multiple layers directly depends. The encoder further comprises an encoding unit configured to generate a coded multi-layer video stream by encoding the pictures of the multiple layers based on the coding dependencies and an associating unit configured to associate the coding relationship information with the coded multi-layer video stream.

In an embodiment of this yet another related aspect the information determiner comprises a relationship determiner configured to determine any coding relationship between the multiple layers, and a flag determiner configured to determine, for a layer with layer index i of the multiple layers and based on the coding relationship, at least one direct decoding flag indicating a direct coding relationship between the layer with layer index i and a layer with layer index j of the multiple layers, i≠j. The associating unit is, in this embodiment, configured to associate the at least one direct decoding flag with the coded multi-layer video stream.

A variant of this yet another related aspect of the embodiments defines an encoder configured to encode a multi-layer video stream defining multiple layers of pictures, each layer of the multiple layers having a respective layer identifier. The encoder comprises a processor configured to process code means of a computer program stored in a computer readable medium. The code means causes, when run on the processor, the processor to hierarchically map, for each layer of the multiple layers, a layer identifier of the layer to a layer index based on coding dependencies between the multiple layers. The code means also causes the processor to determine coding relationship information defining a respective layer index of any reference layer of the multiple layers, on which a layer of the multiple layers directly depends. The code means further causes the processor to generate a coded multi-layer video stream by encoding the pictures of the multiple layers based on the coding dependencies. The code means additionally causes the processor to associate the coding relationship information with the coded multi-layer video stream.

Further aspects of the embodiments define a user device and a network node comprising a device for determining decoding relationship according to above and/or a decoder according to above above and a user device comprising a device for determining coding relationship according to above and/or an encoder according to above.

BRIEF DESCRIPTION OF THE DRAWINGS

The embodiments, together with further objects and advantages thereof, may best be understood by making reference to the following description taken together with the accompanying drawings, in which:

FIG. 3 illustrates an example of an encoded portion of a picture in a multi-layer video stream;

FIG. 4 illustrates an example of a data packet of a multi-layer video stream;

FIG. 5 is a flow diagram illustrating a method of decoding a coded multi-layer video stream according to an embodiment;

FIG. 6 is a flow diagram illustrating a method of determining decoding relationship for a coded multi-layer video stream according to an embodiment;

FIG. 7 is a flow diagram illustrating a method of determining decoding relationship for a coded multi-layer video stream according to another embodiment;

FIG. 8 is a flow diagram illustrating an additional, optional step of the method in FIG. 7;

FIG. 9 is a flow diagram illustrating a method of encoding a multi-layer video stream according to an embodiment;

FIG. 10 is a flow diagram illustrating a method of determining coding relationship information for a multi-layer video stream according to an embodiment;

FIG. 15 is a schematic block diagram of an encoder according to an embodiment;

FIG. 16 is a schematic block diagram of a device for determining coding relationship according to an embodiment;

FIG. 17 is a schematic block diagram of a device for determining coding relationship according to another embodiment;

FIG. 18 is a schematic block diagram illustrating a particular implementation example of devices according to the embodiments;

DETAILED DESCRIPTION

Throughout the drawings, the same reference numbers are used for similar or corresponding elements.

The present embodiments generally relate to multi-layer video streams and sequences and in particular to encoding and decoding such multi-layer video streams. The embodiments provide an efficient way of signaling layer dependency for the multi-layer video stream, thereby enabling a reduction in a number of bits required to signal such layer dependencies as compared to prior art techniques.

Figure 1:
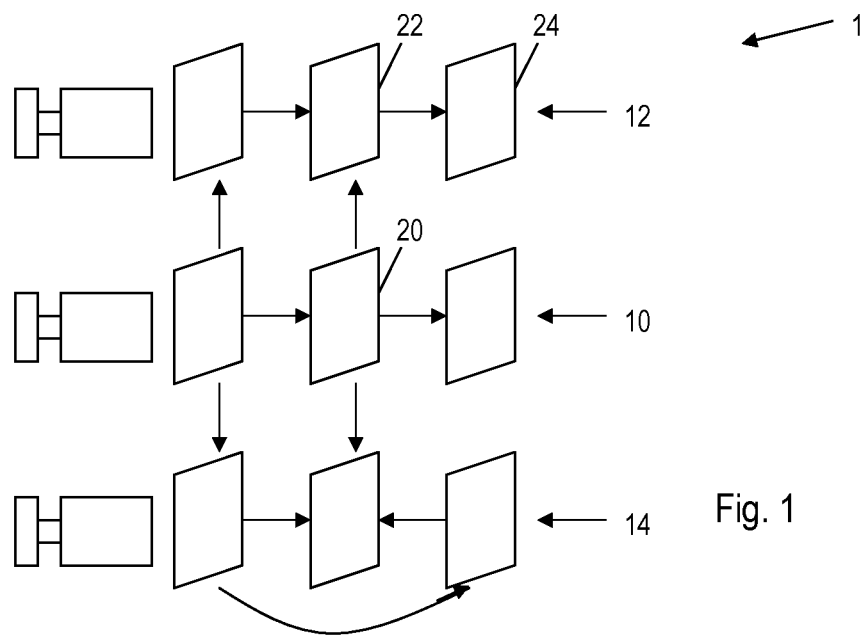
FIG. 1 schematically illustrates an example of a multi-layer video stream.

Multi-layer video generally refers to multi-view video, 3D video and/or scalable video. In multi-view video a scene is captured from different camera views as indicated in FIG. 1 showing three such camera views. The multi-layer video stream 1 then comprises, in this example, pictures 20, 22, 24 from three different layers 10, 12, 14 or views. Pictures 20, 22, 24 in the multi-layer video stream 1 can be encoded and decoded using reference pictures belonging to the same layer 10, 12, 14 or view or belonging to another layer 10, 12, 14 or view. FIG. 1 schematically illustrates the coding and decoding relationships between the pictures by arrows. For instance, picture 24 is encoded and decoded relative to a previous, according to an encoding and decoding order, picture 22 belonging to the same layer 12 or view. This picture 22 is, though, encoded and decoded using a previous picture of the same layer 12 or view and another picture 20 belonging to another layer 10 or view. In FIG. 1 the layer 10 or view is the base layer or view, whereas the other layers 12, 14 or views are additional layers or views, also known as enhancement layers or dependent views.

In 3D video the additional layer(s) may carry depth information or other data that could be used together with the pixel data of the base layer in order to generate 3D video.

In scalable video the additional layer(s) may represent the video in higher video picture resolutions, higher pixel fidelity and/or other color-spaces in order to provide improved video quality relative to the base layer of the scalable video.

Figure 23:
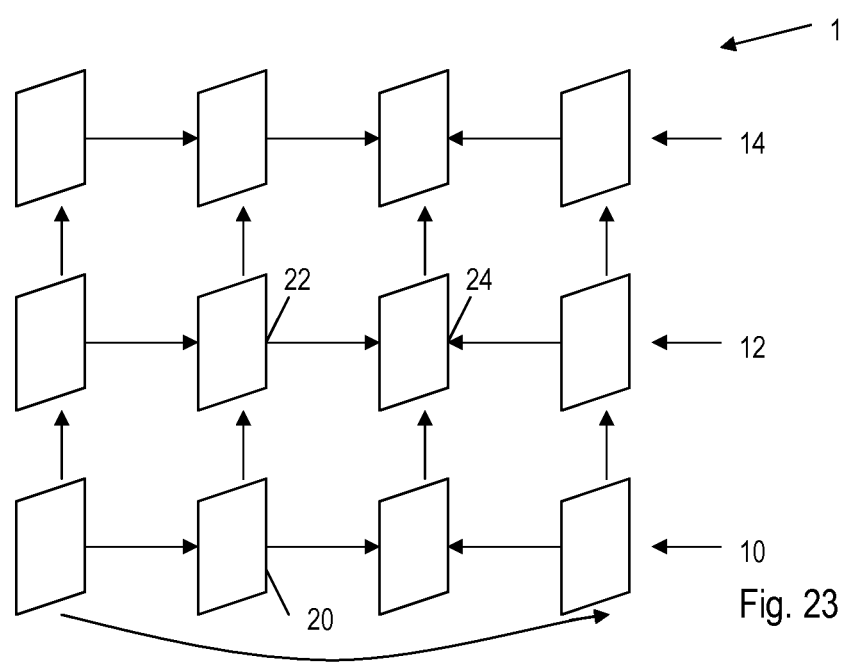
FIG. 23 schematically illustrates another example of a multi-layer video stream.

FIG. 23 schematically illustrates an example of a multi-layer video stream 1 for scalable video. The figure indicates the organization of the pictures 20, 22, 24 in various scalable layers 10, 12, 14, where layer 10 indicates the base layer.

Figure 2:
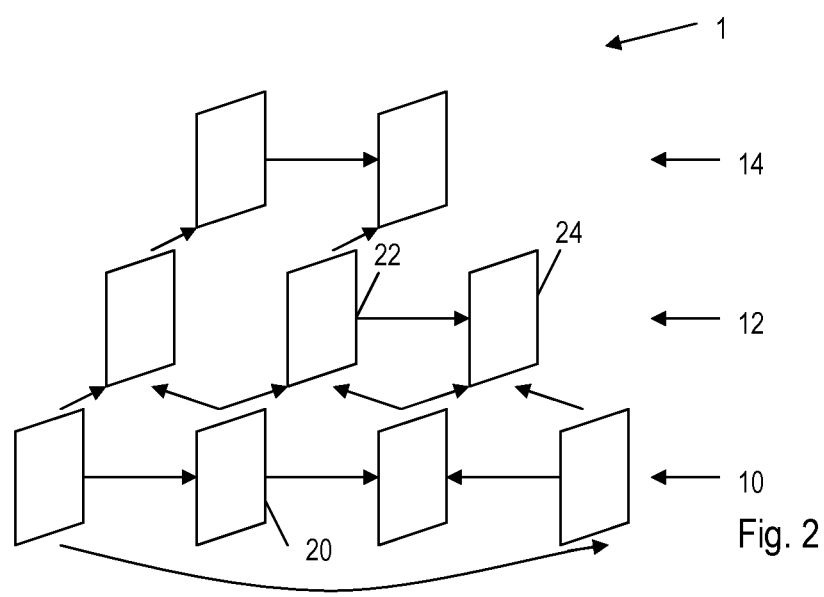
FIG. 2 schematically illustrates another example of a multi-layer video stream.

FIG. 2 schematically illustrates temporal scalability in which each enhancement layer 12, 14 refines the frame rate.

A picture of a multi-layer video stream may be composed of one or more slices. A slice is an independently decodable piece of the picture. In other words, if one slice is lost, the other slices of that picture are still decodable.

Figure 19:
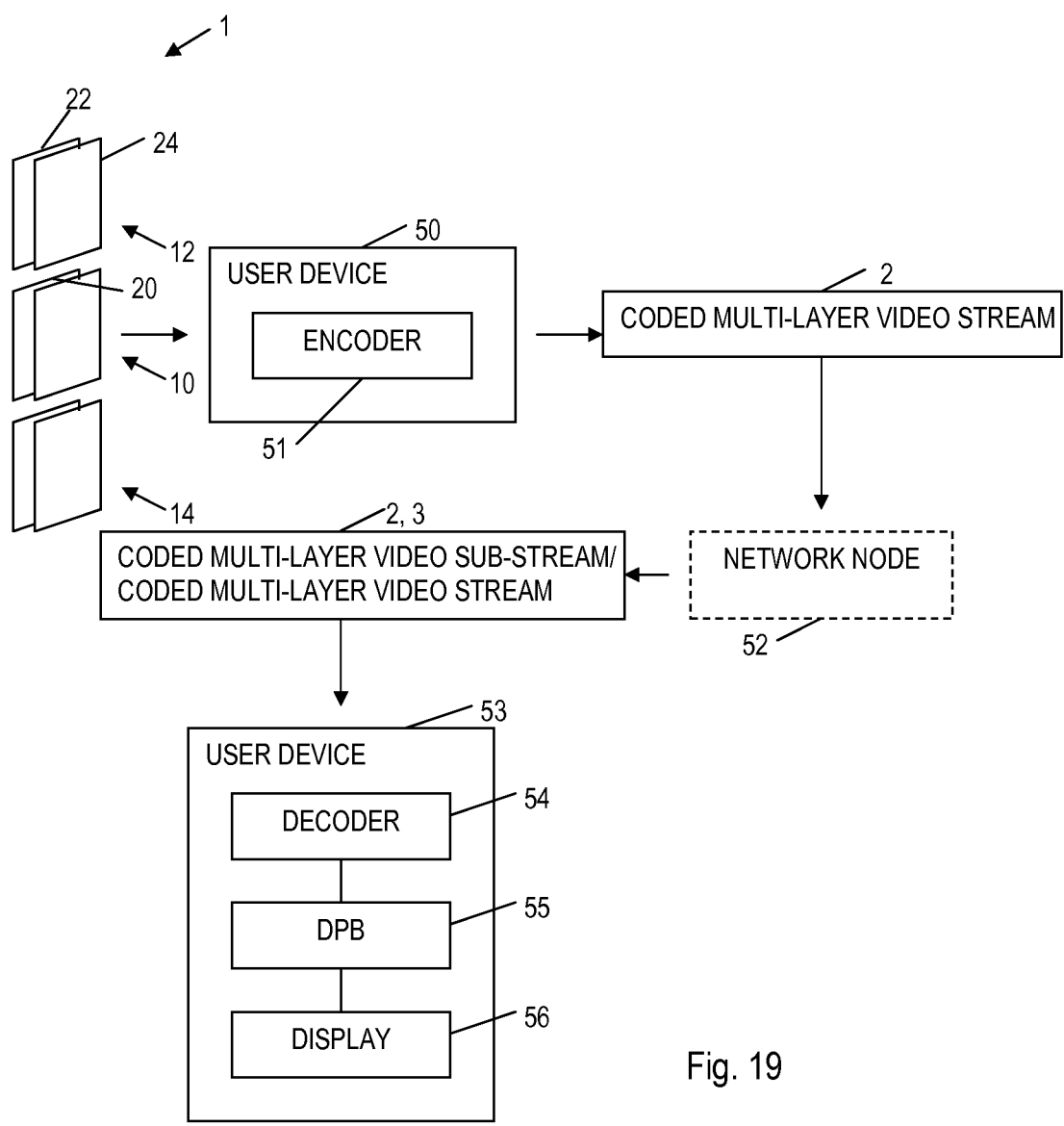
FIG. 19 is a schematic overview of encoding a multi-layer video stream, transmitting a coded multi-layer video stream, optional multi-layer video sub-stream extraction and decoding and display of a multi-layer video stream.

The encoding of a slice generates an encoded representation 30 of the slice comprising a slice header 32 and slice data 34 as is shown in FIG. 3. The encoded presentation 30 is output from the encoding process as a so called Network Adaptation Layer (NAL) unit 44 as shown in FIG. 4. The NAL unit 44 may be added with headers 42 to form a data packet 40 that can be transmitted as a part of a coded multi-layer video stream from an encoder to a decoder. For instance, Real-time Transport Protocol (RTP), User Datagram Protocol (UDP) and Internet Protocol (IP) headers 42 could be added to the NAL unit 44. This form of packetization of NAL units 44 merely constitutes an example in connection with video transport. Other approaches of handling NAL units 44, such as file format, MPEG-2 transport streams, MPEG-2 program streams, etc. are possible. FIG. 19 schematically illustrates the generation of a coded multi-layer video stream 2 from an input multi-layer video stream 1 comprising multiple layers 10, 12, 14 of pictures 20, 22, 24.

An aspect of the embodiments relates to a method of decoding a coded multi-layer video stream 2 defining multiple layers 10, 12, 14 of pictures 20, 22, 24. Each layer 10, 12, 14 of the multiple layers 10, 12, 14 has a respective layer identifier. The method comprises retrieving, for a layer 12 with a layer index of the multiple layers 10, 12, 14, decoding relationship information based on the coded multi-layer video stream 2. The decoding relationship information defines a respective layer index of any reference layer 10 of the multiple layers 10, 12, 14 on which the layer 12 directly depends. The method also comprises mapping, for each reference layer 10 and for the layer 12, its layer index to a layer identifier based on mapping information of a hierarchical mapping relationship between layer identifiers and layer indices. The mapping information is retrieved based on the coded multi-layer video stream 2. The method further comprises decoding a picture 22 of the layer 12 based on at least one previously decoded picture 20 in a layer 10 of the multiple layers 10, 12, 14 identified based on the layer identifiers mapped from layer indices.

An embodiment of this aspect will now be further described with reference to the flow diagram of FIG. 5. FIG. 5 hence discloses a method of decoding a coded multi-layer video stream, such as a multi-view video stream, a 3D video stream or a scalable video stream. The multi-layer video stream defines or comprises multiple layers of pictures. Each such layer of the multi-layer video stream has a respective layer identifier.

The method typically starts in step S1 where decoding relationship information is retrieved for a (current) layer of the multiple layers in the multi-view video stream. The current layer for which the decoding relationship information is retrieved has a layer index. Thus, the current layer has, in addition to the above identified layer identifier that is a general or "global" identifier for the current layer, a layer index that is an index employed for signaling layer dependencies. Hence, the layer index is preferably configured to be used instead of the layer identifier for the signaling of layer dependencies.

The decoding relationship information retrieved in step S1 defines a respective layer index of any reference layer of the multiple layers in the multi-view video stream, on which the current layer directly depends. Thus, the decoding relationship information defines a respective layer index of each reference layer that the current layer directly depends on.

As used herein a layer X directly depends (or is directly dependent) on a layer Y if e.g. pixel prediction from layer Y to layer X needs to be utilized to decode layer X. Thus, a picture belonging to layer X is encoded and thereby decoded based on a reference picture belonging to layer Y.

Correspondingly, if a layer X directly depends (or is directly dependent) on a layer Y but does not directly depend (is not directly dependent) on a layer Z but the layer Y directly (or indirectly) depends (is directly or indirectly dependent) on the layer Z then the layer X indirectly depends (is indirectly dependent) on the layer Z. A layer X depends (is dependent) on a layer Z if it either directly depends (is directly dependent) on the layer Z or indirectly depends (is indirectly dependent) on the layer Z.

If a layer X directly depends on a layer Y this layer Y is a direct reference layer for the layer X.

With reference to FIG. 2 or 23, the layer with reference number 12 directly depends on the base layer 10. The layer with reference number 14 directly depends on the layer with reference number 12 and indirectly depends on the base layer 10.

The decoding relationship information as retrieved in step S1 preferably lists the respective layer indices of the reference layers, on which the current layer depends. Hence, also the reference layers have a respective layer index in addition to their respective layer identifier.

In an embodiment, the decoding relationship information is present in a parameter set included as a part of the multi-layer video stream, for instance in a NAL unit, or provided out-of-band with regard to the multi-layer video stream. The parameter set preferably has an assigned parameter set identifier enabling identification of the relevant parameter set. Such a parameter set identifier is then preferably included in the multi-layer video stream, such as present in a slice header of an encoded representation of a slice. Alternatively, the (first) parameter set identifier is included in a second parameter set with a second parameter set identifier that is included in the multi-layer video stream e.g. in the slice header. In a further alternative, the (first) parameter set identifier is included in a second parameter set with a second parameter set identifier that is included in a third parameter set that has a third parameter set identifier that is included in the multi-layer video stream e.g. in the slice header.

In a first example, the decoding relationship information could be included in a VPS identified by a VPS identifier included in an SPS that is identified by an SPS identifier included in a PPS having an associated PPS identifier included in a slice header.

In a second example, the decoding relationship information could be included in an SPS that is identified by an SPS identifier included in a PPS having an associated PPS identifier included in a slice header.

In a third example, the decoding relationship information could be included in a PPS having an associated PPS identifier included in a slice header.

The decoding relationship information could, alternatively or in addition, be included in a supplemental message, e.g. in a Supplemental Enhancement Information (SEI) message, such as in an active parameter sets SEI message.

In another embodiment, the decoding relationship information is present in multi-layer extension data included as a part of the multi-layer video stream or provided out-of-band. Such multi-layer extension data could be in the form of, for instance, multi-view extension data, 3D extension data or scalable extension data. An alternative is to have extension data relating to a parameter set, such as VPS extension data, PPS extension data or SPS extension data. Parameter set extension data, such as VPS extension data, SPS extension data, or PPS extension data, could be present as an optional extension of VPS, SPS, or PPS data structures, e.g. depending on a flag. That is, a VPS/SPS/PPS could have an extension flag that indicates whether further data, extending the VPS/SPS/PPS, is present.

In a further embodiment, the decoding relationship information is present in the encoded representations of the coded multi-layer video stream. For instance, the decoding relationship information could be present in a respective slice header of one or more encoded representations. In such a case, no identifiers to other data structures of or associated with the multi-layer video stream is needed. However, this approach increases the total size in terms of the number of bits of the encoded representations that carries the mapping information.

A next step S2 of FIG. 5 comprises mapping the layer index to a layer identifier for each reference layer defined by the decoding relationship information as retrieved in step S1 and for the current layer. This mapping of indices-to-identifiers in step S2 is performed based on mapping information of a hierarchical mapping relationship between layer identifiers and layer indices. This mapping information is preferably retrieved based on the coded multi-layer video stream. The mapping information could be retrieved from a parameter set, a parameter set extension, from another data structure of or associated with the coded multi-layer video stream, from an encoded representation of a slice in the coded multi-layer video stream, etc. The mapping information is preferably provided in the same data structure as the decoding relationship information but could, alternatively, be present in another data structure.

The mapping information defines a hierarchical mapping relationship between layer identifiers and layer indices. Hierarchical mapping indicates as used herein that the layer indices are assigned to the various layers in accordance with layer dependencies. In a particular embodiment, layers are indexed in a hierarchical way such that a layer with a given layer index i can have only reference layers with lower indices j, i.e. j<i. Thus, the respective layer index j assigned to the layer(s) of the multiple layers in the multi-layer video stream that the current layer with layer index i is dependent on is preferably lower than the layer index i. This further implies that a layer with layer index i can have at most i reference layers, j=0, . . . , i−1.

The usage of layer indices instead of layer identifiers enables a more bit-efficient way of signaling layer dependencies. Generally, the layer identifiers are, as indicated in the background section, of six bits each for HEVC. The layer identifiers may, however, be sparsely assigned, i.e. some values of the 6-bits layer identifiers are never used. The hierarchical mapping between layer identifiers and layer indices according to an embodiment enables usage of layer indices that are assigned in a non-sparse way, i.e. all values of the layer indices are used.

The method as shown in FIG. 5 further comprises a step S3, which comprises decoding a picture of the current layer based on at least one previously decoded picture in a layer of the multiple layers in the multi-layer video stream, where this layer is identified based on the layer identifiers mapped from the layer indices. Hence, the decoding relationship information retrieved in step S1 is used to provide layer indices of any reference layers. The mapping information is then used in step S2 to map the respective layer index defined by the decoding relationship information to a respective layer identifier and also map the layer index of current layer to a layer identifier. A picture, or more correctly at least one picture, in the current layer is then decoded based on at least one previously decoded picture, i.e. a reference picture, in a layer identified based on at least one of the layer identifiers obtained in the mapping performed in step S2. The reference picture used in the decoding step S3 could be a reference picture belonging to the current layer or to another layer of the multi-layer video stream. If more than one reference picture is to be used as decoding basis for the picture to be decoded in step S3 these reference pictures could belong to the same or different layers of the multi-layer video stream.

The layer indices employed by the embodiments to signal layer dependencies may be different from the layer identifiers. The number of layers is typically less than the number of different possible layer identifiers, such as 64 possible layer identifiers for a 6-bit layer identifier representation. Thus, the number of bits employed for signaling a layer index is typically lower than the number of bits used to signal a layer identifier. Furthermore, whereas a layer identifier is represented by a syntax element of a fixed number of bits, such as in u(6) code, requiring six bits for representing the layer identifier, a layer index is preferably represented by a syntax element of a variable length, such as in u(v) code. Therein, the number v of bits used for indicating a layer index may be determined based on the maximum number of layers used, for example as v=ceil(log 2(max_layers)), where max_layers indicates the maximum number of layers used, i.e. max_layers=vps_max_layers_minus1+1, log 2(x) indicates a base-2 logarithm of x and ceil(y) indicates the smallest integer number greater than or equal to y.

In an implementation example, the following syntax elements could be used to indicate the decoding relationship information and the mapping information.

| vps_extension( ) { | Descriptor |
|---|---|
| . . . | |
|    for( i = 1; i ≤ vps_max_layers_minus1; i++ ) { | |
|       layer_id_in_nuh[ i ] | u(6) |
|    } | |
| . . . | |
|    for( i = 1; i ≤ vps_max_layers_minus1; i++ ) { | |
|       num_direct_ref_layers[ i ] | u(v) |
|       for( j = 0; j < num_direct_ref_layers[ i ]; j++) | |
|          ref_layer_index[ i ][ j ] | u(v) |
|    } | |
| } | |

In the first loop i represents the layer index and layer_id_in_nuh[i] indicates the layer identifier for layer index i. Hence, these syntax elements constitute the mapping information. In the second loop num_direct_ref_layers[i] specifies the number of layers the layer with layer index i directly depends on. ref_layer_index[i][j] identifies the layer index of the j-th layer the layer with layer index i directly depends on. In this example implementation a hierarchical layer relationship is used such that a layer with index i can only have reference layers that have layer indices j<i.

The mapping information as used in step S2 and the decoding relationship information retrieved in step S1 together enables an efficient signaling of layer dependencies by exploiting a hierarchical layer relationship and a dense assignment of layer indices. As a consequence, the number of bits required for signaling layer dependencies can be reduced as compared to using layer identifiers.

Thus, the usage of layer indices for signaling layer dependencies instead of the layer identifiers and the usage a hierarchical layer indexing syntax elements or codewords of minimal length can be used for defining the decoding relationship information.

In certain embodiments the layer indices could be the same as the layer identifiers, i.e. layer_index=layer_id. However, in such a case the layer identifiers are preferably hierarchically organized with regard to layer dependencies as disclosed herein. In such a case, the VPS extension data disclosed above could be represented as shown below:

| | |
|---|---|
| vps_extension( ) { | Descriptor |
| ... | |
|    vps_nuh_layer_id_present_flag | u(1) |
|    for( i = 1; i ≤ vps_max_layers_minus1; i++ ) { | |
|      if( vps_nuh_layer_id_present_flag ) | |
|        layer_id_in_nuh[ i ] | u(6) |
|    } | |
| ... | |
| } | |

If vps_nuh_layer_id_present_flag is equal to zero then there is no explicit mapping between layer identifiers and layer indices. In such a case, it could be implicitly inferred that layer_id_in_nuh[i]=i.

Hence, in an embodiment the mapping step S2 in FIG. 5 comprises retrieving a flag vps_nuh_layer_id_present_flag based on the coded multi-layer video stream, such as from a VPS extension as indicated above. The mapping step S2 further comprises setting, for each reference layer and for the layer and if vps_nuh_layer_id_present_flag=0, its layer identifier equal to its layer index. The mapping step S2 also comprises retrieving, for each reference layer and for the layer and if vps_nuh_layer_id_present_flag=1, its layer identifier from a vector layer_id_in_nuh[i], i∈[1, vps_max_layers_minus1], wherein vps_max_layers_minus1+1 indicates a maximum number of layers and layer_id_in_nuh[i] indicates the layer identifier for the layer with layer index i.

Another aspect of the embodiments relates to a method of encoding a multi-layer video stream 1 defining multiple layers 10, 12, 14 of pictures 20, 22, 24. Each layer 10, 12, 14 of the multiple layers 10, 12, 14 has a respective layer identifier. The method comprises hierarchically mapping, for each layer 10, 12, 14 of the multiple layers 10, 12, 14, a layer identifier of the layer 10, 12, 14 to a layer index based on coding dependencies between the multiple layers 10, 12, 14. The method also comprises determining coding relationship information defining a respective layer index of any reference layer 10 of the multiple layers 10, 12, 14, on which a layer 12 of the multiple layers 10, 12, 14 directly depends. The method further comprises generating a coded multi-layer video stream 2 by encoding the pictures 20, 22, 24 of the multiple layers 10, 12, 14 based on the coding dependencies and associating the coding relationship information with the coded multi-layer video stream 2.

FIG. 9 is a flow diagram illustrating an embodiment of the method of encoding a multi-layer video stream. The method starts in step S40, which comprises hierarchically mapping a respective layer identifier of each layer in the multi-layer video stream to a respective layer index. This mapping between layer identifiers and layer indices is performed based on coding dependencies between the multiple layers of the multi-layer video stream. Thus, the assignment of layer indices to the layers is conducted based on how the various layers depend on each other. In particular, the assignment of the layer indices during the mapping in step S40 is performed such as that a layer with assigned layer index i can only have reference layers, i.e. depend on layers, that have layer indices j, where j is smaller than i. Thus, given information of how the layers of the multi-view video stream depend on each other the layer identifiers of the layer are mapped to layer indices to form the hierarchical layer relationship.

Step S41 of the method comprises determining coding relationship information defining a respective layer index of any reference layer which a current layer of the multi-layer video stream directly depends on. Thus, the coding relationship information specifies the layer index or indices of all the reference layers for the current layer.

A coded multi-view video stream is generated in step S42 by encoding the pictures of the multiple layers based on and according to the coding dependencies between the multiple layers. Thus, P or B slices in the various layers are encoded using one or more reference pictures belonging to the same layer as the P or B slice or belonging to one of the reference layers for the layer of the P or B slice. The picture could, alternatively, be an I picture. In such a case, reference pictures are not handled in the same way as normal "temporal" reference pictures. Still an I picture, e.g. in a scalable HEVC extension, could have a reference picture, for "inter-layer prediction".

The coded multi-view video stream preferably comprises respective encoded representations 30 of slices as shown in FIG. 3 for each slice of the multi-layer video stream. The encoded representations 30 are advantageously packed into NAL units 44 as shown in FIG. 4. The coded multi-layer video stream may also comprise NAL units 44 comprising other data, such as parameter sets, than the encoded representations 30.

The coding relationship information determined in step S41 is associated, in step S43, with the coded multi-layer video stream generated in step S42. This step S43 could be performed prior to step S42 or at least partly in parallel with step S42. The association of the coding relationship information with the coded multi-layer video stream could be performed according to various embodiments as previously disclosed herein. For instance, the coding relationship information could be present in a parameter set in which case a parameter set identifier is included in a slice header of at least one encoded representation of a slice in the coded multi-layer video stream or in another parameter set that is identifiable based on data included in the slice header. Alternatively, the coding relationship information could be present in a parameter set extension or indeed in encoded representations of slices.

In a particular embodiment mapping information employed in step S40 to hierarchically map a respective layer identifier to a respective layer index is preferably generated and associated with the coded multi-layer video stream. In such a case, this mapping information is preferably provided in the same data structure as the coding relationship information as previously discussed herein.

Aspects of the embodiments also relate to methods of determining decoding relationships for a coded multi-layer video stream and determining coding relationships for a multi-layer video stream. These embodiments could advantageously be applied to the method of decoding as shown in FIG. 5 or the method of encoding as shown in FIG. 9. Alternatively, these methods of determining coding/decoding relationships could be used separately from the method of FIG. 5 and the method of FIG. 9.

If these methods of determining coding/decoding relationships are used separated from the method of FIG. 5 and the method of FIG. 9, the methods could either use layer indices for the multiple layers in the multi-layer video stream or layer identifiers in the multi-layer video stream. Thus, in the latter case no explicit mapping of layer identifiers into layer indices is necessary. For such instances, layer index/layer indices as used herein with reference to the methods of determining coding/decoding relationships can be replaced by layer identifier/layer identifiers. It is then particularly preferred that the layer identifiers are hierarchically organized.

An aspect of the embodiments relates to a method of determining decoding relationship for a coded multi-layer video stream 2 defining multiple layers 10, 12, 14 of pictures 20, 22, 24. The method comprises retrieving, based on the coded multi-layer video stream 2, at least one direct decoding flag indicating a direct coding relationship between a layer 12 with layer index i of the multiple layers 10, 12, 14 and a layer 10 with layer index j of the multiple layers 10, 12, 14, i≠j. The method also comprises determining information defining any decoding relationship between the multiple layers 10, 12, 14 based on the at least one direct decoding flag.

FIG. 6 is a flow diagram illustrating an embodiment of this method of determining decoding relationship for a coded multi-layer video stream defining multiple layers of pictures. The method starts in step S10, which comprises retrieving at least one direct decoding flag based on the coded multi-layer video stream. The at least one direct decoding flag could be present in a parameter set, such as PPS, SPS or VPS, a parameter set extension, such as PPS extension, SPS extension or VPS extension, be present in an encoded representation of a slice, such as in the slice header, of the coded multi-layer video stream, or elsewhere being provided in a data structure of or associated with the coded multi-layer video stream. Thus, the coded multi-layer video stream either comprises the at least one direct decoding flag or comprises information, such as an identifier, allowing identification of the data structure comprising the at least one direct decoding flag. The retrieval in step S10 could therefore be performed by parsing and decoding a parameter set or parameter set extension to obtain the direct decoding flag. Alternatively and if the parameter set or parameter set extension already has been parsed and decoded and the data of the parameter set or parameter set extension is stored in a decoded form in a memory, step S10 could comprise reading or retrieving the at least one direct decoding flag from such a memory. If the at least one direct decoding flag is present in an encoded representation of a slice step S10 preferably retrieves the at least one direct decoding flag in connection with parsing and decoding the slice header in the encoded representation.

The at least one direct decoding flag retrieved in step S10 indicates a direct coding relationship between a layer with layer index i (current layer) of the multiple layers and a layer with layer index j of the multiple layers, where i≠j. Thus, the at least one direct decoding flag indicates whether there is any direct coding and thereby decoding relationship between the layers with layer indices i and j. In a particular embodiment, the direct decoding flag indicates whether the layer with layer index j is a direct reference layer for the layer with layer index i.

The at least one direct decoding flag is preferably a 1-bit flag, i.e. can assume either the value $0_{bin}$ or the value $1_{bin}$. In such a case, a direct decoding flag set to $1_{bin}$ could indicate that the layer with layer index j is a direct reference layer for the layer with layer index i, whereas a direct decoding flag set to $0_{bin}$ instead indicates that the layer with layer index j is not a direct reference layer for the layer with layer index i.

The method also comprises determining, in step S11, information defining any decoding relationship between the multiple layers in the multi-layer video stream based on the at least one direct decoding flag retrieved in step S10. Thus, the at least one direct decoding flag retrieved in step S10 is used to determine the information defining the decoding relationship between the various layers in the multi-layer video stream.

The method then ends in an embodiment.

In an alternative embodiment the information determined in step S11 is used as the decoding relationship information in the method of decoding a coded multi-layer video stream described in connection with FIG. 5. In such a case, the method continues from step S11 of FIG. 6 to step S2 of FIG. 5.

This means that in this alternative embodiment the layer indices are hierarchically assigned to the various layers so that a layer with layer index i has any reference layers that have layer indices j<i. In such a case, the direct decoding flags enable a very compact and efficient way of signaling layer dependencies for the multi-layer video stream.

The determination of the information in step S11 could, which is further discussed below, involve generating or calculating the information using the at least one direct decoding flag retrieved in step S10. In an alternative embodiment, the determination of the information defining any decoding relationship between the multiple layers could simply be the determination of the value(s) of the at least one direct decoding flag. Thus, in this case the respective value of the at least one direct decoding flag as decoded could constitute the information determined or provided in step S11.

In an embodiment of step S10 a respective direct dependency flag is retrieved for the layer with layer index i for each layer index j based on the coded multi-layer video stream. In this embodiment j<i and the direct dependency flag indicates whether the layer with layer index j is a direct reference layer for the layer with layer index i.

Step S11 preferably comprises, in this embodiment, determining information defining any layer with layer index j<i which the layer with layer index i depends on based on the direct dependency flag(s) retrieved in step S10. Thus, the direct dependency flag(s) obtained in step S10 is (are) used in order to determine the information defining the layer(s) with respective layer index lower than the layer index of the current layer (layer index i) which the current layer directly or indirectly depends on.

In an embodiment step S10 comprises retrieving, form a video parameter set or a video parameter set extension associated with the coded multi-layer video stream, the at least one direct decoding flag indicating the direct coding relationship between the layer with layer index i and the layer with layer index j.

In a particular embodiment step S10 preferably comprises retrieving, for the layer with layer index i, a respective direct dependency flag direct_dependency_flag[i][j] for each layer index j based on the coded multi-layer video stream. In this particular embodiment step S11 preferably comprises determining a dependency flag set or array dependency_flag[i] for the layer with layer index i. This dependency flag set is preferably determined as dependency_flag[i]=direct_dependency_flag[i]+sum$_{j=0 \ldots i-1}$(direct_dependency_flag[i][j]× dependency_flag[j]).

direct_dependency_flag[i] represents a vector, i.e. a concatenation of elements in direct_dependency_flag[i][j];

"+" represents a bit-wise logical OR operation;

sum$_{j=0 \ldots i-1}$(x(j)) represents a bit-wise logical OR operation over all x(j) with j=0 . . . i−1; and "×" represents a bit-wise AND operation between each element in dependency_flag[j] and direct_dependency_flag[i][j]

In such a case, the syntax elements for signaling the direct dependency flags could be as defined below.

| for( i = 1; i ≤ vps_max_layers_minus1; i++ ) { | Descriptor |
|---|---|
| // layer dependency<br>  for( j = 0; j < i; j++ )<br>    direct_dependency_flag[ i ][ j ]<br>} | u(1) | direct_dependency_flag[i][j] equal to zero preferably indicates that the layer with layer index j is not a direct reference layer for the layer with layer index i. direct_dependency_flag[i][j] equal to one preferably indicates that the layer with layer index j is a direct reference layer for the layer with layer index i. If not present direct_dependency_flag[i][j] is preferably inferred to be equal to zero.

vps_max_layers_minus1+1 indicates the maximum possible number of layers in the coded multi-layer video stream.

If this embodiment is used in connection with the method of decoding as shown in FIG. 5 the direct dependency flags and the mapping information could be signaled together, such as in a VPS extension as shown below.

| vps_extension( ) { | Descriptor |
|---|---|
| ...<br>  for( i = 1; i ≤ vps_max_layers_minus1; i++ ) {<br>    layer_id_in_nuh[ i ]<br>  }<br>  ...<br>  for( i = 1; i ≤ vps_max_layers_minus1; i++ ) {<br>    for( j = 0; j < i; j++ )<br>      direct_dependency_flag[ i ][ j ]<br>  }<br>} | <br><br>u(6)<br><br><br><br><br>u(1) |

In another embodiment step S10 of FIG. 6 comprises retrieving, for a layer with layer index i, a respective direct reference flag for each layer index j based on the coded multi-layer video stream. In this embodiment j>i and the direct reference flag indicates whether the layer with layer index i is a direct reference layer for the layer with layer index j. Step S11 preferably comprises determining information defining any layer with layer index j>i for which the layer with layer index i is a (direct or indirect) reference layer based on the direct reference flag(s) retrieved in step S10.

In a particular embodiment step S10 preferably comprises retrieving, for the layer with layer index i, a respective direct reference flag direct_reference_flag[i][j] for each layer index j based on the coded multi-layer video stream. Step S11 preferably comprises determining a reference flag set or array reference_flag[i] for the layer with layer index i. This reference flag set is preferably determined as reference_flag[i]=direct_reference_flag[i]+sum$_{j=i+1 \ldots imax}$(direct_reference_flag[i][j]×reference_flag[j]).

reference_flag[i] represents a vector, i.e. a concatenation of elements in reference_flag[i][j];
  direct_reference_flag[i] represents a vector, i.e. a concatenation of elements in direct_reference_flag[i][j];
  "+" represents a bit-wise logical OR operation;
  sum$_{j+1 \ldots imax}$(x(j)) represents a bit-wise logical OR operation over all x(j) with j=i+1 . . . imax, where imax represents the maximum layer index; and
  "x" represents a bit-wise AND operation between each element in reference_flag[j] and direct_reference_flag[i][j]

In such a case, the syntax elements for signaling the direct dependency flags could be as defined below.

| for( i = 1; i ≤ vps_max_layers_minus1; i++ ) { | Descriptor |
|---|---|
| // layer dependency<br>  for( j = i+1; j ≤ vps_max_layers_minus1; j++ )<br>    direct_reference_flag[ i ][ j ]<br>} | u(1) | direct_reference_flag[i][j] equal to zero preferably indicates that the layer with layer index i is not a direct reference layer for the layer with layer index j. direct_reference_flag[i][j] equal to one preferably indicates that the layer with layer index i is a direct reference layer for the layer with layer index j. If not present direct_reference_flag[i][j] is preferably inferred to be equal to zero.

If this embodiment is used in connection with the method of decoding as shown in FIG. 5 the direct reference flags and the mapping information could be signaled together, such as in a VPS extension as shown below. This embodiment then preferably has a hierarchical layer relationship since a layer with layer index i can preferably only be a reference layer for layers with layer index j>i.

| vps_extension( ) { | Descriptor |
|---|---|
| ...<br>  for( i = 1; i ≤ vps_max_layers_minus1; i++ ) {<br>    layer_id_in_nuh[ i ]<br>  }<br>  ...<br>  for( i = 1; i ≤ vps_max_layers_minus1; i++ ) {<br>    for( j = i+1; j ≤ vps_max_layers_minus1; j++ )<br>      direct_reference_flag[ i ][ j ]<br>  }<br>} | <br><br>u(6)<br><br><br><br><br>u(1) |

In a further embodiment step S10 of FIG. 6 comprises retrieving, for a layer with layer index i, a respective direct dependency flag direct_dependency_flag[i][j] for each layer index j based on said coded multi-layer video stream.

In a particular embodiment direct_dependency_flag[i][j] equal to 0 indicates that the layer with layer index j is not a direct reference layer for the layer with layer index i. Correspondingly, direct_dependency_flag[i][j] equal to 1 indicates that the layer with layer index j may be a direct reference layer for the layer with layer index i.

Step S11 of FIG. 6 comprises in this embodiment determining variables NumDirectRefLayers[i] and RefLayerId[i][j], respectively, based on the direct dependency flags direct_dependency_flag[i][j]. NumDirectRefLayers[i] is a variable represents the number of direct reference layers for the layer with layer index i and the variable RefLayerId[i][j] represents the layer identifier of the jth direct reference layer for the layer with layer index i.

In a particular embodiment, the variables NumDirectRefLayers[i] and RefLayerId[i][j] are derived in step S11 according to:

```
for( i = 1; i ≤ vps_max_layers_minus1; i++ )
  for( j = 0; NumDirectRefLayers[ i ] = 0; j < i; j++ )
    if( direct_dependency_flag[ i ][ j ] == 1)
      RefLayerId[ i ][ NumDirectRefLayers[ i ]++ ] =
        layer_id_in_nuh[ j ]
```

If this embodiment is used in connection with the method of decoding as shown in FIG. 5 the direct reference flags and the mapping information could be signaled together, such as in a VPS extension as shown below. This embodiment then preferably has a hierarchical layer relationship since a layer with layer index i can preferably only be a reference layer for layers with layer index j>i.

```
vps_extension( ) {                                            Descriptor
    ...
    for( i = 1; i ≤ vps_max_layers_minus1; i++ ) {
        layer_id_in_nuh[ i ]                                  u(6)
    }
    ...
    for( i = 1; i ≤ vps_max_layers_minus1; i++ ) {
        for( j = i+1; j ≤ vps_max_layers_minus1; j++ )
            direct_reference_flag[ i ][ j ]                   u(1)
    }
}
```

An aspect of the embodiments relates to a method of determining decoding relationship for a coded multi-layer video stream 2 defining multiple layers 10, 12, 14 of pictures 20, 22, 24. The method optionally comprises calculating a length of a number syntax element. The method also comprises retrieving, based on the coded multi-layer video stream 2, the number syntax element defining a number of reference layers of the multiple layers 10, 12, 14 for a layer 12 with layer index i of the multiple layers 10, 12, 14, optionally based on the length of the number syntax element. The method further comprises retrieving, based on the coded multi-layer video stream 2 and for each of the number of reference layers, a respective reference syntax element defining a layer index j of a layer 10 of the multiple layers 10, 12, 14 that the layer 12 with layer index i directly depends on, j<i.

FIG. 7 is a flow diagram illustrating an embodiment of this method of determining decoding relationship for a coded multi-layer video stream defining multiple layers of pictures. The method starts in an optional step S20, which comprises calculating a length of a number syntax element. This number syntax element preferably defines a number of reference layers for a current layer with layer index i.

In a particular embodiment the length of the number syntax element in terms of number of bits is variable and depends on at least one input parameter or syntax element as further discussed below. In such a case, the length of the number syntax element could be calculated in step S20 to determine how many bits the number syntax element encompasses. It is possible that the number syntax element has a length common for multiple layers, such as all layers, in the multi-layer video stream. In such a case, the length of the number syntax element could be calculated once in step S20 for a first layer. This calculated length value could then be stored and reused for the other layers in the multi-layer video stream, thereby relaxing the need for performing step S20 for each layer in the multi-layer video stream.

Step S21 of FIG. 7 comprises retrieving the number syntax element based on the coded multi-layer video stream. The number syntax element could be retrieved from a parameter set, a parameter set extension, any other data structure of or associated with the coded multi-layer video stream or from an encoded representation of the slice in the coded multi-layer video stream.

In an embodiment, step S21 comprises retrieving the number syntax element based on the length of the number syntax element as calculated in the optional step S20. Thus, information of the length of the number syntax element is employed in step S21 in order to identify the portion, i.e. the number of bits, in the relevant structure that corresponds to the number syntax element.

In an alternative approach, the retrieval of the number syntax element is performed in step S21 without using any calculated length of the number syntax element. For instance, the number syntax element could be identified based on parsing and decoding the data structure, such as starting from the beginning of the data structure.

The method then continues to step S22 where a respective reference syntax element is retrieved based on the coded multi-layer video stream and for each of the number of reference layers as defined by the number syntax element retrieved in step S21. The reference syntax element(s) retrieved in step S22 could be retrieved from a parameter set, a parameter set extension, any other data structure of or associated with the coded multi-layer video stream or from an encoded representation of the slice in the coded multi-layer video stream. In a particular embodiment, the reference syntax element(s) is (are) preferably present in the same data structure as the number syntax element.

A reference syntax element defines a layer index j of a layer in the multi-layer video stream that the current layer with layer index i directly depends on. In addition, in a preferred embodiment a hierarchical layer relationship is induced such that j<i.

The number syntax element, thus, signals how many reference layers the current layer with layer index i directly depends on. This number syntax element is therefore employed in step S22 in order to know how many reference syntax elements to retrieve for the layer with layer index i. Each such reference syntax element retrieved in step S22 defines a respective layer index j for a layer that the current layer with layer index i directly depends on.

The method then ends in an embodiment.

In an alternative embodiment the reference syntax elements retrieved in step S22 are used as the decoding relationship information in the method of decoding a coded multi-layer video stream described in connection with FIG. 5. In such a case, the method continues from step S22 of FIG. 7 to step S2 of FIG. 5.

In a first particular embodiment the optional step S20 comprises calculating the length of the number syntax element based on the layer index i. Thus, in this embodiment the length of the number syntax element is calculated based on the particular value of the layer index i.

In a first example implementation step S20 comprises calculating the length of the number syntax element as ceil(log 2(i+1)), wherein i represents the layer index, ceil(x) represents a smallest integer number greater than or equal to x and log 2(x) represents a base-2 logarithm of x.

Consequently, in this example implementation the number of bits used to represent the number of reference layers, i.e. the number syntax element, is represented by a u(v) code with v=ceil(log 2(i+1)).

In a second particular embodiment the optional step S20 comprises calculating the length of the number syntax element based on information of a maximum possible number of layers in the coded multi-layer video stream.

In a second example implementation step S20 comprises calculating the length of the number syntax element as ceil(log 2(vps_max_layers_minus1+1)), wherein vps_max_layers_minus1+1 indicates, as previously disclosed herein, the maximum number of layers in the coded multi-layer video stream.

This second example implementation would be slightly less bit efficient than the first example implementation. However, an advantage is that the code length of the number syntax element is independent on the particular layer (layer index), which may lead to a less complex decoding of the syntax structure.

In a third particular embodiment the optional step S20 comprises calculating the length of the number syntax element based on information of a maximum value of a layer identifier in the coded multi-layer video stream.

In a third example implementation step S20 comprises calculating the length of the number syntax element as ceil(log 2(vps_max_layer_id−1)), wherein vps_max_layer_id indicates the maximum possible value for the layer identifiers (layer_id) in the coded multi-layer video stream.

In an optional embodiment the method as shown in FIG. 7 comprises an additional step S30, see FIG. 8. In such a case the method continues from step S21 of FIG. 7. Step S30 comprises calculating a respective length of the respective reference syntax elements to be retrieved in step S22 of FIG. 7.

In an embodiment, step S30 comprises calculating the respective length of the respective reference syntax element based on the layer index i, such as based on the particular value of this layer index i.

In a first implementation example the number of bits used to represent the reference syntax element(s) is equal to ceil(log 2(i)).

In such a case, the syntax elements for signaling the number syntax element and the reference syntax elements could be as defined below.

| for( i = 1; i ≤ vps_max_layers_minus1; i++ ) { | Descriptor |
|---|---|
|    num_direct_ref_layers[ i ] | u(v) |
|    for( j = 0; j < num_direct_ref_layers[ i ]; j++) | |
|       ref_layer_index[ i ][ j ] | u(v) |
| } | | num_direct_ref_layers[i] specifies the number of reference layer the layer with layer index i directly depends on. The number of bits used to represent num_direct_ref_layers[i] could be v=ceil(log 2(i+1)) or v=ceil(log 2(vps_max_layers_minus1+1)) or v=ceil(log 2(vps_max_layer_id−1)). ref_layer_index[i][j] identifies the layer index of the j-th layer the layer with layer index i directly depends on. The number of bits used to represent ref_layer_index[i][j] is preferably equal to v=ceil(log 2(i)).

If this embodiment is used in connection with the method of decoding as shown in FIG. 5 the number syntax elements, the reference syntax elements and the mapping information could be signaled together, such as in a VPS extension as shown below. This embodiment then preferably has a hierarchical layer relationship since a layer with layer index i can preferably only be a reference layer for layers with layer index j>i.

| vps_extension( ) { | Descriptor |
|---|---|
| ... | |
| for( i = 1; i ≤ vps_max_layers_minus1; i++ ) { | |
|    layer_id_in_nuh[ i ] | u(6) |
| } | |
| ... | |
| for( i = 1; i ≤ vps_max_layers_minus1; i++ ) { | |
|    num_direct_ref_layers[ i ] | u(v) |

| vps_extension( ) { | Descriptor |
|---|---|
|    for( j = 0; j < num_direct_ref_layers[ i ]; j++) | |
|       ref_layer_index[ i ][ j ] | u(v) |
|    } | |
| } | |

In a second implementation example an assumption is made that the reference indices, i.e. the reference syntax elements, are indicated in a hierarchical order of layer indices for the reference layers. For instance, it can be assumed that ref_layer_index[i][j]>ref_layer_index[i][j−1] for j>0, wherein ref_layer_index[i][j] represents the layer index of the j-th layer that the layer with layer index directly depends on. Then the j-th reference layer index for the layer with layer index i can be represented as a delta layer index, delta_ref_layer_index[i][j], such that ref_layer_index[i][j]=ref_layer_index[i][j−1]+1+delta_ref_layer_index[i][j]. In such a case, ref_layer_index[i][−1]=−1 and delta_ref_layer_index[i][j]≥0. With a hierarchical layer relationship ref_layer_index[i][j]<i and, thus, 0≤delta_ref_layer_index[i][j]<i−ref_layer_index[i][j−1]−1. This in turn implies that delta_ref_layer_index[i][j] can be represented by a u(v) code with v=ceil(log 2(i−ref_layer_index[i][j−1]−1)).

In such a case, the syntax elements for signaling the number syntax element and the reference syntax elements could be as defined below.

| for( i = 1; i ≤ vps_max_layers_minus1; i++ ) { | Descriptor |
|---|---|
|    num_direct_ref_layers[ i ] | u(v) |
|    for( j = 0; j < num_direct_ref_layers[ i ]; j++) | |
|       delta_ref_layer_index[ i ][ j ] | u(v) |
| } | |

An aspect of the embodiments relates to a method of determining coding relationship for a multi-layer video stream 1 defining multiple layers 10, 12, 14 of pictures 20, 22, 24. The method comprises determining any coding relationship between the multiple layers 10, 12, 14. The method also comprises determining, for a layer 12 with layer index i of the multiple layers 10, 12, 14 and based on the coding relationship, at least one direct decoding flag indicating a direct coding relationship between the layer 12 with layer index i and a layer 10 with layer index j of the multiple layers 10, 12, 14, i≠j. The method further comprises associating the at least one direct decoding flag with a coded representation 2 of the multi-layer video stream 1.

FIG. 10 is a flow diagram illustrating an embodiment of this method of determining coding relationship for a multi-layer video stream defining multiple layers of pictures. The method generally starts in step S50, which comprises determining any coding relationship between the multiple layers in the multi-layer video stream. The coding relationship is preferably determined based on information of which layers reference pictures used for coding the pictures in a current layer belong to. Thus, by determining in which layer or layers the reference pictures used as coding basis for pictures in the current layer any coding relationship between the various layers in the multi-layer video stream can be determined in step S50.

The coding relationship determined for the multi-layer video stream in step S50 is then used in step S51 to determine, for a layer with layer index i, at least one direct decoding flag indicating a direct coding relationship between the layer with layer index i and a layer with layer index j, where i is different from j. This means that the coding relationship is employed to identify any direct coding relationship, i.e. direct dependency, between the current layer with layer index i and any other layers in the multi-layer video stream. Such direct dependency between layers is then indicated by the direct decoding flag(s) determined in step S51.

The method also comprises associating, in step S52, the at least one direct decoding flag with a coded representation of the multi-layer video stream. This associating in step S52 preferably, as has previously been disclosed herein, involves including the direct decoding flag(s) in a parameter set, parameter set extension, other data structure of or associated with the coded multi-layer video stream or in at least one encoded representation of a slice in the coded multi-layer video stream.

The method then ends.

The method as disclosed in FIG. 10 could be implemented as a stand alone method of determining coding relationship for a multi-layer video stream. In an alternative approach, the method of FIG. 10 is used together with the method of encoding a multi-layer video stream as shown in FIG. 9. In such a case, the steps S50 and S51 of FIG. 10 are performed as a particular embodiment of determining the coding relationship information in FIG. 9. In such a case, the method preferably starts in step S40 of FIG. 9 and continues to steps S50 and S51 of FIG. 10 and then returns to step S42 of FIG. 9. Step S43 of FIG. 9 is then preferably performed as shown in step S52 of FIG. 10.

An aspect of the embodiments relates to a method of determining coding relationship for a multi-layer video stream 1 defining multiple layers 10, 12, 14 of pictures 20, 22, 24. The method comprises determining a number syntax element defining a number of reference layers of the multiple layers 10, 12, 14 for a layer 12 with layer index i of the multiple layers 10, 12, 14. The method also comprises determining, for each of the number of reference layers, a respective reference syntax element defining a layer index j of a layer 10 of the multiple layers 10, 12, 14 that the layer 12 with layer index i directly depends on, j<i. The method further comprises associating the number syntax element and the respective reference syntax elements with a coded representation 2 of the multi-layer video stream 1.

Figure 11:
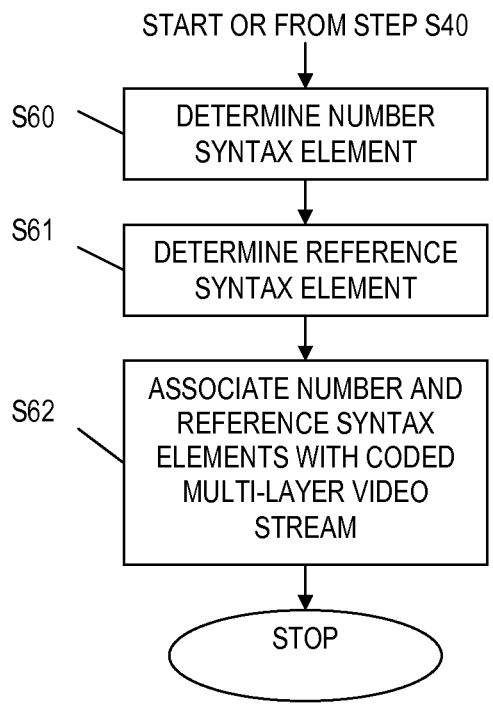
FIG. 11 is a flow diagram illustrating a method of determining coding relationship information for a multi-layer video stream according to another embodiment.

FIG. 11 is a flow diagram illustrating an embodiment of this method of determining coding relationship for a multi-layer video stream. The method starts in step S60 where a number syntax element is determined for a layer with layer index i in the multi-view video stream. This number syntax element represents the number of reference layers for the layer with layer index i.

The number syntax element is preferably determined based on information of which layers reference pictures used for coding the pictures in a current layer with layer index i belong to. Thus, by determining in which layer or layers the reference pictures used as coding basis for pictures in the current layer the number of such reference layers can be defined and used for determining the number syntax element in step S60.

The method of FIG. 11 also comprises determining, in step S61, a respective reference syntax element for each of the number of reference layers. Thus, if the number syntax element defines X reference layers then X respective reference syntax elements are preferably determined in step S61. A reference syntax element as determined in step S61 defines a layer index j of a layer in the multi-layer video stream that the layer with layer index i directly depends on. In a particular embodiment, a hierarchical layer dependency is used so that the j<i.

The number syntax element determined in step S60 and the reference syntax elements determined in step S61 are then associated with a coded representation of the multi-layer video stream in step S62. This associating in step S62 preferably, as has previously been disclosed herein, involves including the number and reference syntax elements in a parameter set, parameter set extension, other data structure of or associated with the coded multi-layer video stream or in at least one encoded representation of a slice in the coded multi-layer video stream.

The method then ends.

The method as disclosed in FIG. 11 could be implemented as a stand alone method of determining coding relationship for a multi-layer video stream. In an alternative approach, the method of FIG. 11 is used together with the method of encoding a multi-layer video stream as shown in FIG. 9. In such a case, the steps S60 and S61 of FIG. 11 are performed as a particular embodiment of determining the coding relationship information in FIG. 9. In such a case, the method preferably starts in step S40 of FIG. 9 and continues to steps S60 and 651 of FIG. 11 and then returns to step S42 of FIG. 9. Step S43 of FIG. 9 is then preferably performed as shown in step S62 of FIG. 11.

Simulation experiments have been conducted in order to determine the number of bits required for signaling layer dependencies. Three different methods of signaling such layer dependencies have been compared: the prior art layer dependency signaling disclosed in the previously mentioned document JCTVC-K1007 (referred to as K1007 in FIGS. 20-22), layer dependency signaling as disclosed herein in which num_direct_ref_layers[i] and ref_layer_id[i][j] are in u(v) code instead of u(6) code (referred to as u(v) in FIGS. 20-22) and layer dependency signaling using direct_reference_flag[i][j] as disclosed herein (referred to as dependency_flag in FIGS. 20-22).

Figure 20:
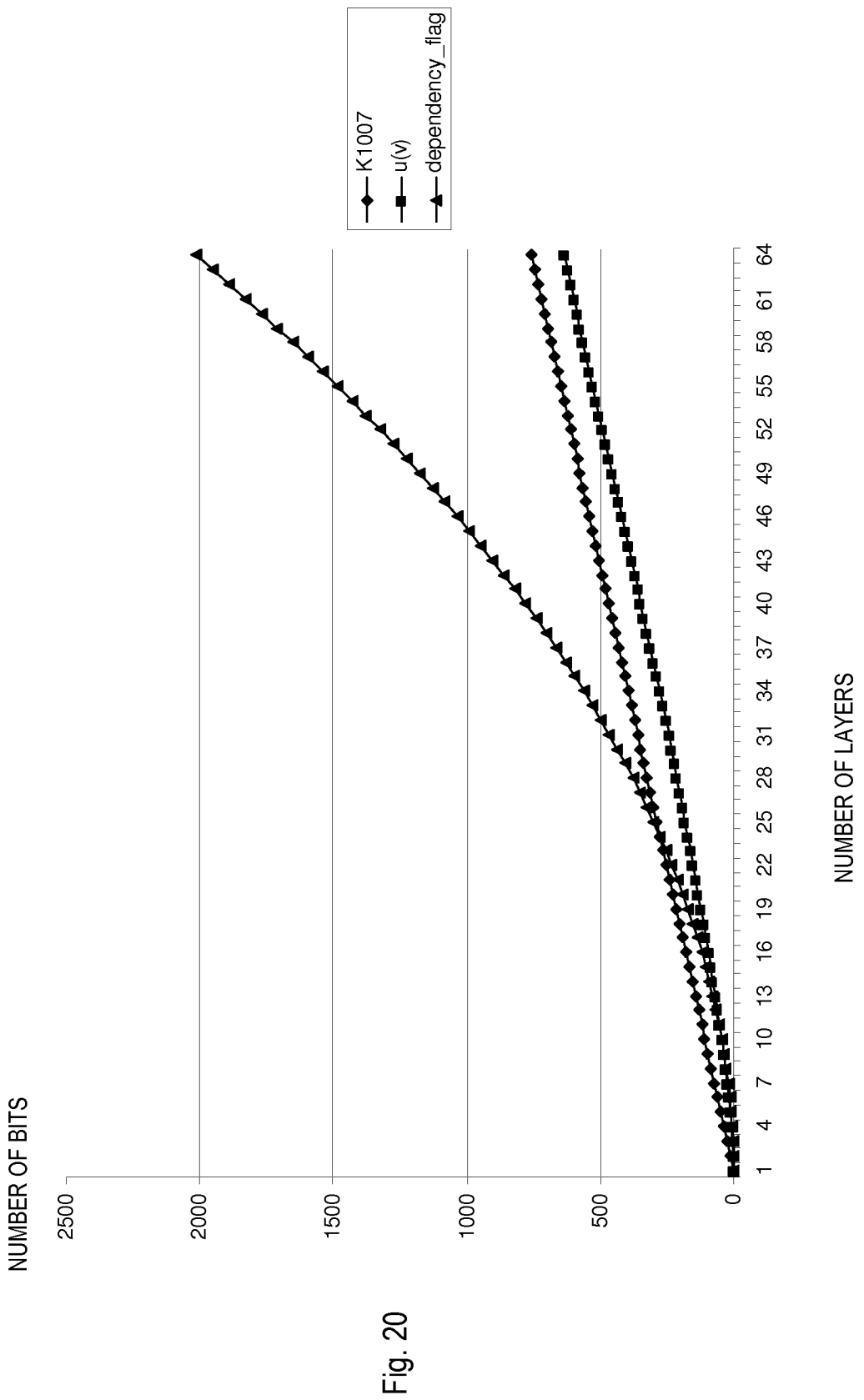
FIG. 20 is a diagram illustrating the number of bits required for signaling layer dependencies when each layer with layer index $i \geq 1$ has one reference layer.
Figure 21:
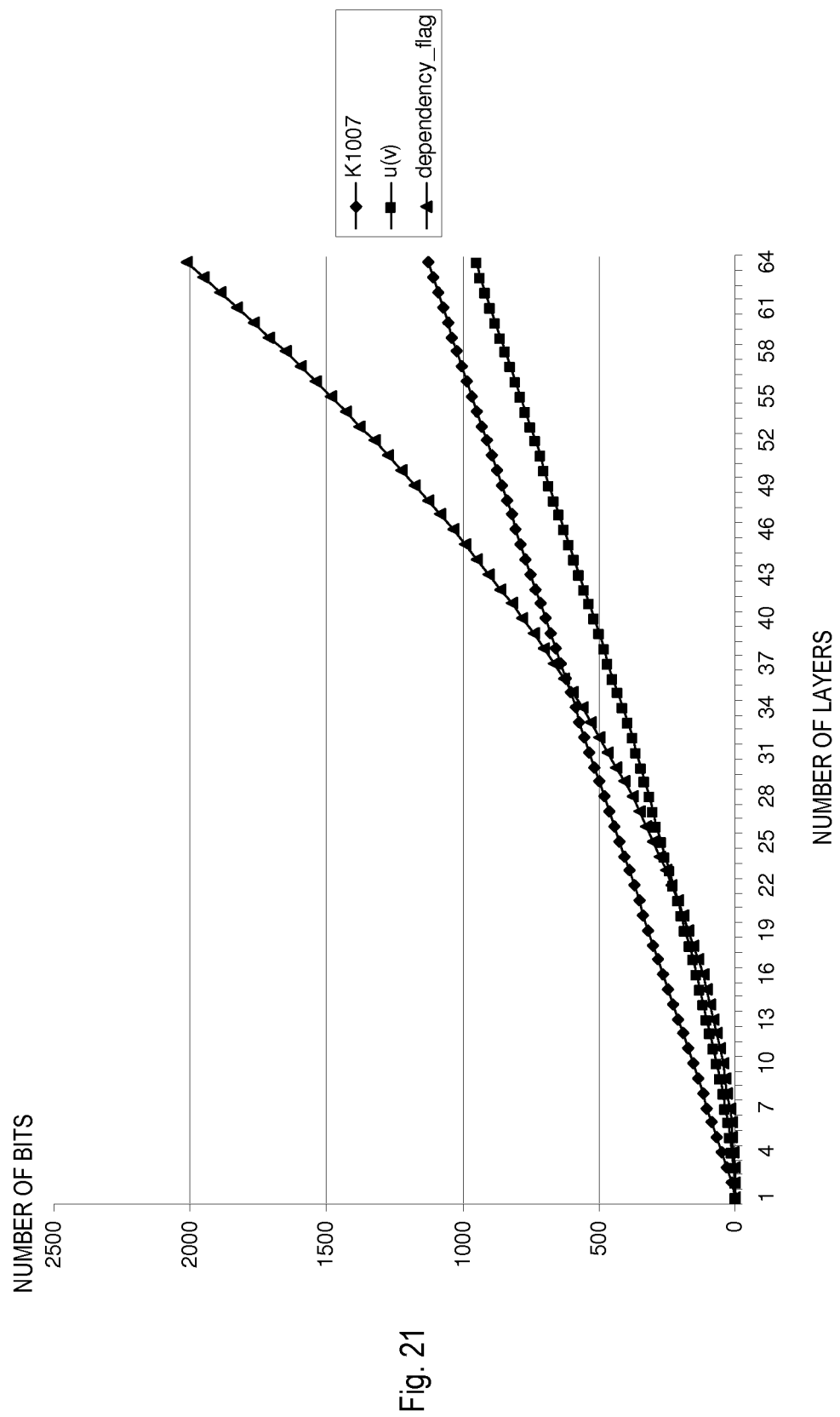
FIG. 21 is a diagram illustrating the number of bits required for signaling layer dependencies when each layer with layer index $i \geq 2$ has two reference layers and the layer with layer index $i=1$ has one reference layer.
Figure 22:
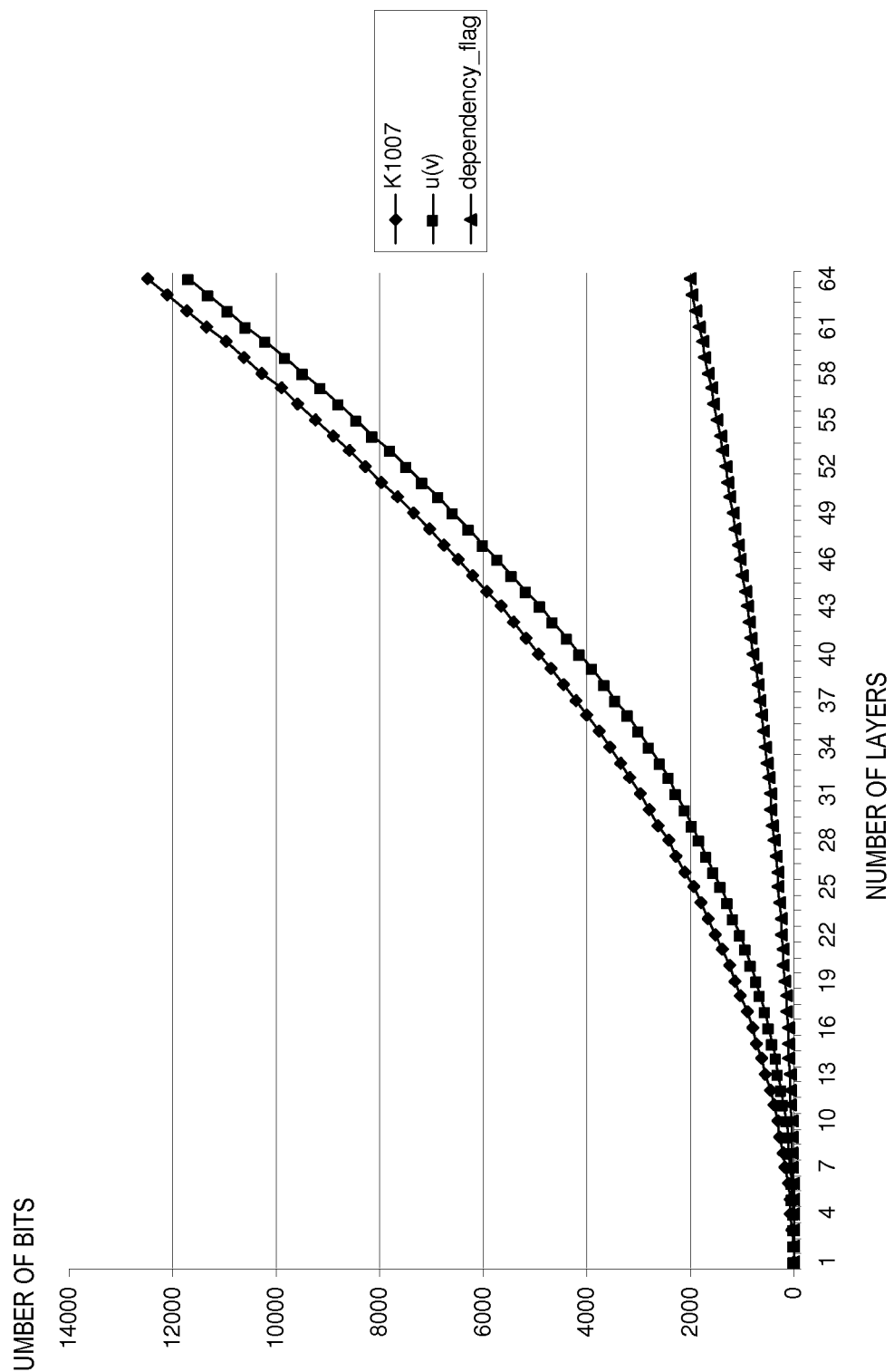
FIG. 22 is a diagram illustrating the number of bits required for signaling layer dependencies when each layer with layer index $i \geq 1$ has the maximum number of reference layers that are possible.

FIG. 20 illustrates the simulation results when each layer with layer index i≥1 has one reference layer. FIG. 21 illustrates the simulation results when each layer with layer index i≥2 has two reference layers and the layer with layer index i=1 has one reference layer, i.e. the maximum number of reference layers that are possible for this layer with layer index i=1. FIG. 22 illustrates the simulation results when each layer with layer index i≥1 has the maximum number of reference layers that are possible, i.e. a layer with layer index i=N has N reference layers. The results in FIGS. 20-22 are depicted for 1 . . . 64 layers, with 64 corresponding to the maximum allowed number of layers.

The results in FIGS. 20-22 show that the u(v) method is always lower than for the K1007 method. Up to a certain threshold for the number of layers (8 in FIG. 20, 21 in FIG. 21 and 64 in FIG. 22) the dependency_flag method has the lowest number of bits. The number of bits for the dependency_flag method is independent of the layer dependency configuration.

An aspect of the embodiments defines a decoder configured to decode a coded multi-layer video stream 2 defining multiple layers 10, 12, 14 of pictures 20, 22, 24, each layer 10, 12, 14 of the multiple layers 10, 12, 14 having a respective layer identifier. The decoder comprises a decoding relationship information retriever configured to retrieve, for a layer 12 with a layer index of the multiple layers 10, 12, 14, decoding relationship information based on the coded multi-layer video stream 2. The decoding relationship information defining a respective layer index of any reference layer 10 of the multiple layers 10, 12, 14, on which the layer 12 directly depends. The decoder also comprises an index-to-identifier mapping unit configured to map, for each reference layer 10 and for the layer 12, its layer index to a layer identifier based on mapping information of a hierarchical mapping relationship between layer identifiers and layer indices. The mapping information is retrieved based on the coded multi-layer video stream 2. The decoder further comprises a decoding unit configured to decode a picture 22 of the layer 12 based on at least one previously decoded picture 20 in a layer 10 of the multiple layers 10, 12, 14 identified based on the layer identifiers mapped from layer indices.

Figure 12:
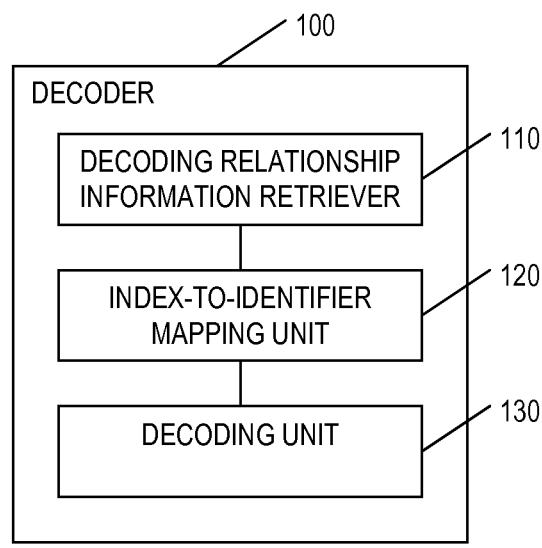
FIG. 12 is a schematic block diagram of a decoder according to an embodiment.

FIG. 12 is a schematic block diagram illustrating an implementation embodiment of a decoder 100 configured to decode a multi-layer video stream in which each layer has a respective layer identifier. The decoder 100 comprises a decoding relationship information retriever 110, also referred to as decoding relationship information retrieving unit or means. The decoding relationship information retriever 110 is configured to retrieve decoding relationship information based on the coded multi-layer video stream for a current layer having a layer index. The decoding relationship information retriever 110 is preferably configured to retrieve the information as previously disclosed herein from a data structure of or associated with the coded multi-layer video stream, such as a parameter set, a parameter set extension, other data structure or an encoded representation of a slice.

The decoding relationship information as retrieved by the decoding relationship information retriever 110 defines a respective layer index of any reference layer in the multi-layer video stream, on which the current layer directly depends.

An index-to-identifier mapping unit 120, also denoted index-to-identifier mapper or mapping means, is configured to map a layer index to a layer identifier for each reference layer and for the current layer based on mapping information of a hierarchical mapping relationship between layer identifiers and indices. The index-to-identifier mapping unit 120 is configured to retrieve the mapping information based on the coded multi-layer video stream, preferably from a same data structure from which the decoding relationship information retriever 110 retrieves the decoding relationship information.

The layer identifiers as obtained from the index-to-identifier mapping unit 120 are used by a decoding unit 130, also referred to as picture decoder or decoding means, when decoding a picture of the current layer based on at least one previously decoded picture in a layer identified based on the layer identifiers.

In an embodiment, the decoding relationship information is input to the index-to-identifier mapping unit 120, which then maps the layer index/indices of the layer/layers the current layer directly depends on.

Thus, in this embodiment only such layer index/indices are mapped together with the layer index of the current layer into respective layer identifiers.

In an alternative embodiment, the index-to-identifier mapping unit 120 is configured to map all layer indices that are signaled in or associated with the coded multi-layer video stream into respective layer identifiers. In such a case, the decoding unit 130 preferably identifies those layer identifiers among the mapped layer identifiers that are of relevance for decoding the pictures in the current layer based on the decoding relationship information from the decoding relationship information retriever 110.

Thus, the decoding relationship information and the mapping information thereby together enable identification and determination of the layer identifiers of any reference layers comprising pictures based on which pictures in the current layer should be decoded.

In an embodiment the index-to-identifier mapping unit 120 is configured to retrieve a flag vps_nuh_layer_id_present_flag based on the coded multi-layer video stream. The index-to-identifier mapping unit 120 is also configured to set, for each reference layer and for the layer and if vps_nuh_layer_id_present_flag=0, its layer identifier equal to its layer index. The index-to-identifier mapping unit 120 is further configured to retrieve, for each reference layer and for the layer and if vps_nuh_layer_id_present_flag=1, its layer identifier from a vector layer_id_in_nuh[i], i∈[1, vps_max_layers_minus1], wherein vps_max_layers_minus1+1 indicates a maximum number of layers and layer_id_in_nuh[i] indicates a layer identifier for a layer with layer index i.

An aspect of the embodiments defines an encoder configured to encode a multi-layer video stream 1 defining multiple layers 10, 12, 14 of pictures 20, 22, 24, each layer 10, 12, 14 of the multiple layers 10, 12, 14 having a respective layer identifier. The encoder comprises a mapping unit configured to hierarchically map, for each layer 10, 12, 14 of the multiple layers 10, 12, 14, a layer identifier of the layer 10, 12, 14 to a layer index based on coding dependencies between the multiple layers 10, 12, 14. The encoder also comprises an information determiner configured to determine coding relationship information defining a respective layer index of any reference layer 10 of the multiple layers 10, 12, 14, on which a layer 12 of the multiple layers 10, 12, 14 directly depends. The encoder further comprises an encoding unit configured to generate a coded multi-layer video stream 2 by encoding the pictures 20, 22, 24 of the multiple layers 10, 12, 14 based on the coding dependencies and an associating unit configured to associate the coding relationship information with the coded multi-layer video stream 2.

FIG. 15 is a schematic block diagram of an embodiment of an encoder 400 configured to encode a multi-layer video stream in which each layer has a respective layer identifier. The encoder 400 comprises a mapping unit 410, also referred to as mapper or mapping means. The mapping unit 410 is configured to hierarchically map a layer identifier for each layer of the multi-layer video stream to a layer index based on coding dependencies between the multiple layers in the multi-layer video stream. This means that information about which layer(s) that is (are) reference layer(s) for (an) other layer(s) is used by the mapping unit 410 to assign layer indices to the layers.

The encoder 400 also comprises an information determiner 420, also denoted information determining unit or means. The information determiner 420 is configured to determine coding relationship information defining a respective layer index of any reference layer based on which a current layer directly depends on.

An encoding unit 430, also referred to as picture encoder or encoding means, is configured to generate a coded multi-layer video stream by encoding the pictures in the multiple layers based on the coding dependencies. An associating unit 440, also referred to as associator or associating means, is configured to associate the coding relationship information with the coded multi-layer video stream, as previously disclosed herein, such as in a parameter set, parameter set extension, other data structure or encoded representation of a slice.

The associating unit 440 is preferably also configured to associate mapping information defining a mapping information defining a hierarchical mapping relationship between the layer identifiers and the layer indices with the coded multi-layer video stream.

Other aspects of the embodiments relate to devices for determining decoding or encoding relationships for a (coded) multi-layer video stream. Such devices could be provided as separate entities or could be implemented as part of the decoder 100 of FIG. 12 or the encoder 400 of FIG. 15.

An aspect of the embodiments defines to a device for determining decoding relationship for a coded multi-layer video stream 2 defining multiple layers 10, 12, 14 of pictures 20, 22, 24. The device comprises a flag retriever configured to retrieve, based on the coded multi-layer video stream 2, at least one direct decoding flag indicating a direct coding relationship between a layer 12 with layer index i of the multiple layers 10, 12, 14 and a layer 10 with layer index j of the multiple layers 10, 12, 14, i≠j. The device also comprises an information determiner configured to determine information defining any decoding relationship between the multiple layers 10, 12, 14 based on the at least one direct decoding flag.

Figure 13:
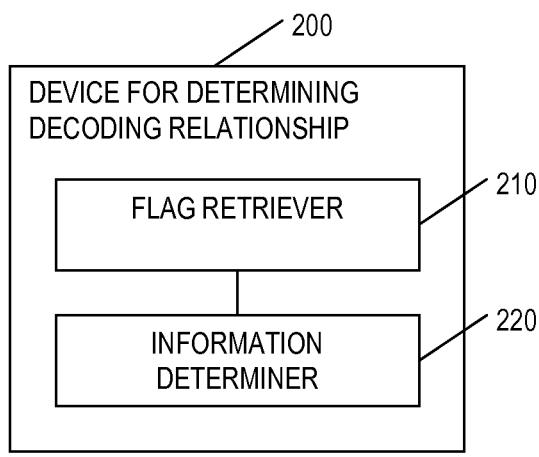
FIG. 13 is a schematic block diagram of a device for determining decoding relationship according to an embodiment.

FIG. 13 is an illustration of an embodiment of such a device 200 for determining decoding relationship. The device 200 comprises a flag retriever 210, also referred to as flag retrieving unit or means. The flag retriever 210 is configured to retrieve at least one direct decoding flag based on the coded multi-layer video stream, such as from a parameter set, parameter set extension, other data structure of an encoded representation of a slice in coded multi-layer video stream. The retrieved at least one direct decoding flag indicates a direct coding relationship between a current layer with layer index i and a layer with layer index j of the multi-layer video stream, where the index i is different from the index j.

The device 200 also comprises an information determiner 220, also referred to as information determining unit or means. The information determiner 220 is configured to determine information defining any decoding relationship between the multiple layers in the multi-layer video stream based on the at least one direct decoding flag retrieved by the flag retriever 210.

In an embodiment the flag retriever 210 is configured to retrieve, for the layer with layer index i, a respective direct dependency flag for each layer index j based on the coded multi-layer video stream. In this embodiment, j<i and the direct dependency flag indicates whether the layer with layer index j is a direct reference layer for the layer with layer index i. The information determiner 220 is preferably configured to determine information defining any layer with layer index j<i, on which the layer with layer index i depends, based on the direct dependency flags.

In an implementation example the flag retriever 210 is configured to retrieve, for the layer with layer index i, a respective direct dependency flag direct_dependency_flag[i][j] for each layer index j based on the coded multi-layer video stream. The information determiner 220 is preferably configured to determine a dependency flag set dependency_flag[i] as dependency_flag[i]=direct_dependency_flag[i]+sum$_{j=0 \ldots i-1}$(direct_dependency_flag[i][j]×dependency_flag[j]). The dependency flag set or the dependency flags dependency_flag[i][j] then constitute(s) in this implementation example the information defining any decoding relationship between the multiple layers.

In another embodiment the flag retriever 210 is configured to retrieve, for the layer with layer index i, a respective direct reference flag for each layer index j based on the coded multi-layer video stream. In this embodiment, j>i and the direct reference flag indicates whether the layer with layer index i is a direct reference layer for the layer with layer index j. The information determiner 220 is, in this embodiment, preferably configured to determine information defining any layer with layer index j>i for which the layer with layer index i is a reference layer based on the direct reference flags.

In another implementation example the flag retriever 210 is configured to retrieve, for the layer with layer index i, a respective direct reference flag direct_reference_flag[i][j] for each layer index j based on the coded multi-layer video stream. The information determiner 220 is, in this example, preferably configured to determine a reference flag set reference_flag[i] as reference_flag[i]=direct_reference_flag[i]+sum$_{j=i+1 \ldots imax}$(direct_reference_flag[i][j]×reference_flag[j]). The reference flag set or the reference flags reference_flag[i][j] then constitute(s) in this implementation example the information defining any decoding relationship between the multiple layers.

The device for determining decoding relationship 200 in FIG. 13 is in an embodiment a particular implementation example of the decoding relationship information retriever 110 of FIG. 12.

Another aspect of the embodiments defines a device for determining decoding relationship for a coded multi-layer video stream 2 defining multiple layers 10, 12, 14 of pictures 20, 22, 24. The device optionally comprises a length calculator configured to calculate a length of a number syntax element. The device comprises an element retriever configured to retrieve, based on the coded multi-layer video stream 2, the number syntax element defining a number of reference layers 10 of the multiple layers 10, 12, 14 for a layer 12 with layer index i of the multiple layers 10, 12, 14, optionally based on the length of the number syntax element. The element retriever is further configured to retrieve, based on the coded multi-layer video stream 2 and for each of the number of reference layers, a respective reference syntax element defining a layer index j of a layer 10 of the multiple layers 10, 12, 14 that the layer 12 with layer index i directly depends on, j<i.

Figure 14:
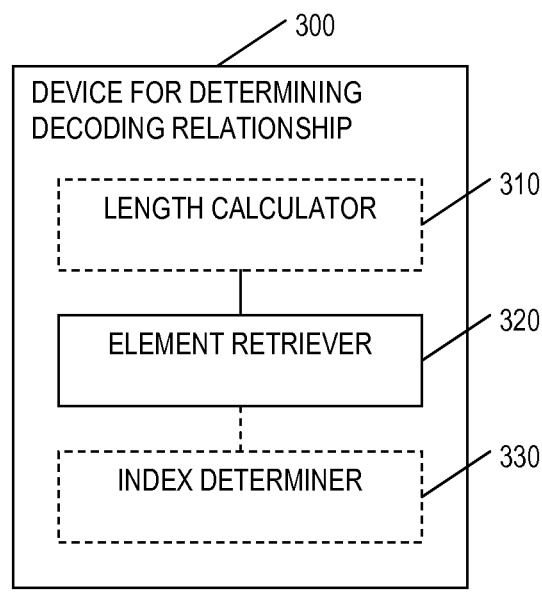
FIG. 14 is a schematic block diagram of a device for determining decoding relationship according to another embodiment.

FIG. 14 is a schematic block diagram of such a device 300 for determining decoding relationship. The device 300 optionally comprises a length calculator 310, also denoted length calculating unit or means. The length calculator 310 is preferably configured to calculate a length of a number syntax element defining a number of reference layer in the multi-layer video steam for a current layer with layer index i. An element retriever 320, also denoted element retrieving unit or means, of the device 300 is configured to retrieve the number syntax element based on the coded multi-layer video stream, such as from a parameter set, parameter set extension, other data structure or encoded representation of a slice. In a particular embodiment, the element retriever 320 uses information of the length of the number syntax element, preferably as determined by the length calculator 310, in order to identify the portion of the relevant number-syntax-element-carrying data structure that corresponds to the number syntax element.

The value of the retrieved number syntax element is also used by the element retriever 320 to determine how many reference syntax elements to retrieve for the current layer with layer index i. Thus, the element retriever 320 retrieves a respective reference syntax element for each of the number of reference layers as defined by the number syntax element. The element retriever 320 preferably retrieves the reference syntax element from parameter set, parameter set extension, other data structure or encoded representation of a slice. In a particular embodiment, the element retriever 320 is configured to retrieve the reference syntax element from the same data structure that also comprises the number syntax element.

Each reference syntax element retrieved by the element retriever 320 defines a layer index j of a reference layer that the current layer with layer index i directly depends on. In a particular embodiment, a hierarchical layer dependency is used so that j<i.

In an embodiment the length calculator 310 is configured to calculate the length of the number syntax element based on the layer index i, i.e. based on the value of the layer index i.

In a particular embodiment the length calculator 310 is configured to calculate the length of the number syntax element as ceil(log 2(i+1)).

In another embodiment the length calculator 310 is configured to calculate the length of the number syntax element based on information of a maximum possible number of layers in the coded multi-layer video stream.

In another particular embodiment the length calculator 310 is configured to calculate the length of the number syntax element as ceil(log 2(vps_max_layers_minus1+1)).

In a further embodiment the length calculator 310 is configured to calculate the length of the number syntax element based on information of a maximum value for a layer identifier in the coded multi-layer video stream.

In a further particular embodiment the length calculator 310 is configured to calculate the length of the number syntax element as ceil(log 2(vps_max_layer_id−1)).

In an embodiment the optional length calculator 310 is configured to calculate a respective length of the respective reference syntax element.

In particular embodiment the length calculator 310 is configured to calculate the respective length of the respective reference syntax element based on the layer index i.

In another particular embodiment the length calculator 310 is configured to calculate the respective length of the reference syntax element as ceil(log 2(i−ref_layer_index[i][j−1]−1)). In such a case, the element retriever 320 is preferably configured to retrieve, based on the coded multi-layer video stream and for each layer j of the number of reference layers, a respective delta reference syntax element delta_ref_layer_index[i][j], j<i. The device 300 preferably comprises an optional index determiner 330 configured to determine, for each layer j of the number of reference layers, the layer index of the j-th layer the layer with layer index i directly depends on as ref_layer_index[i][j]=[i][j−1]+1+delta_ref_layer_index[i][j] with ref_layer_index[i][−1]=−1, 0<j<i.

The device for determining decoding relationship 300 in FIG. 14 is in an embodiment a particular implementation example of the decoding relationship information retriever 110 of FIG. 12.

An aspect of the embodiments defines a device for determining coding relationship for a multi-layer video stream 1 defining multiple layers 10, 12, 14 of pictures 20, 22, 24. The device comprises a relationship determiner configured to determine any coding relationship between the multiple layers 10, 12, 14. The device also comprises a flag determiner configured to determine, for a layer 12 with layer index i of the multiple layers 10, 12, 14 and based on the coding relationship, at least one direct decoding flag indicating a direct coding relationship between the layer 12 with layer index i and a layer 10 with layer index j of the multiple layers 10, 12, 14, i≠j. An associating unit is configured to associate the at least one direct decoding flag with a coded representation 2 of the multi-layer video stream 1.

FIG. 16 shows a block diagram of an embodiment of this device 500 for determining coding relationship for a multi-layer video stream. The device 500 comprises a relationship determiner 510, also referred to as relationship determining unit or means. The relationship determiner 510 is configured to determine any coding relationship between the multiple layers in the multi-layer video stream. The relationship determiner 510 preferably performs this determination as previously disclosed herein based on information of which layers that are used as reference layers for other layers in the multi-layer video stream. The device 500 also comprises a flag determiner 520, also referred to as flag determining unit or means. The flag determiner 520 is configured to determine at least one direct decoding flag for a current layer with layer index i and based on the coding relationship as determined by the relationship determiner 510. A direct decoding flag indicates a direct coding relationship between the current layer with layer index i and a layer with layer index j≠i.

The device 500 further comprises an associating unit 530, also referred to as associator or associating means, configured to associate the at least one decoding flag with a coded representation of the multi-layer video stream, such as inserting the at least one decoding flag in a parameter set, parameter set extension, other data structure or encoded representation of a slice.

The device for determining coding relationship 500 in FIG. 16 is in an embodiment a particular implementation example of the information determiner 420 of FIG. 15.

An aspect of the embodiments defines a device for determining coding relationship for a multi-layer video stream 1 defining multiple layers 10, 12, 14 of pictures 20, 22, 24. The device comprises a number syntax element determiner configured to determine a number syntax element defining a number of reference layers 10 of the multiple layers 10, 12, 14 for a layer 12 with layer index i of the multiple layers 10, 12, 14. The device also comprises a reference syntax element determiner configured to determine, for each of the number of reference layers 10, a respective reference syntax element defining a layer index j of a layer 10 of the multiple layers 10, 12, 14 that the layer 12 with layer index i directly depends on, j<i. The device further comprises an associating unit configured to associate the number syntax element and the respective reference syntax elements with a coded representation 2 of the multi-layer video stream 1.

FIG. 17 shows a block diagram of an embodiment of this device 600 for determining coding relationship for a multi-layer video stream. The device 600 comprises number syntax element determiner 610, also denoted number syntax element determining unit or means. The number syntax element determiner 610 is configured to determine a number syntax element defining a number of reference layer for layer with layer index i. The number syntax element determiner 610 preferably determines the number syntax elements based on information of which reference layers, if any, reference pictures, based on which pictures in the current layer with layer index i, belong.

The device 600 also comprises a reference syntax element determiner 620, sometimes referred to as reference syntax element determining unit or means. The reference syntax element determiner 620 is configured to determine a respective reference syntax element for each of the number of reference layers as defined by the number syntax element. A reference syntax element as determined by the reference syntax element determiner 620 defines a layer index j of a reference layer of the multi-layer video stream that the current layer with layer index i directly depends on. In a particular embodiment, a hierarchical layer dependency is used so that j<i.

An associating unit 630, also denoted associator or associating means, of the device 600 is configured to associate the number syntax element and the respective reference syntax elements with a coded representation of the multi-layer video stream. The number and reference syntax elements could be inserted in a same or different parameter sets, parameter set extensions, other data structures or encoded representations of slices.

The device for determining coding relationship 600 in FIG. 17 is in an embodiment a particular implementation example of the information determiner 420 of FIG. 15.

The decoder 100 in FIG. 12, the devices 200, 300 for determining decoding relationship in FIGS. 13 and 14, the encoder 400 of FIG. 15 and the devices 500, 600 for determining coding relationship in FIGS. 16 and 17 may be implemented in hardware. There are numerous variants of circuitry elements that can be used and combined to achieve the functions of the units of the decoder, encoder or devices in FIGS. 12-17. Such variants are encompassed by the embodiments. Particular examples of hardware implementation include implementation in digital signal processor (DSP) hardware and integrated circuit technology, including both general-purpose electronic circuitry and application-specific circuitry.

Alternatively, the decoder 100 in FIG. 12, the devices 200, 300 for determining decoding relationship in FIGS. 13 and 14, the encoder 400 of FIG. 15 and the devices 500, 600 for determining coding relationship in FIGS. 16 and 17 may be implemented at least partly in software. Such an implementation is shown in FIG. 18. The decoder, encoder or device 700 of FIGS. 12-17 then comprises a processor 710 configured to process code means 740 of a computer program 730 stored in a computer readable medium, represented by a memory 720 in FIG. 18. The code means 740 causes, when run on the processor 710, the processor 710 to perform the functions of the units of the decoder, encoder or devices of FIGS. 12-17.

The processor 710 could be a general purpose or specially adapted computer, processor or microprocessor, such as a central processing unit (CPU). The software includes computer program code elements or software code portions effectuating the operation of at least the decoding relationship information retriever 110, the index-to-identifier mapping unit 120 and the decoding unit 130 of FIG. 12, and/or the flag retriever 210 and the information determiner 220 of FIG. 13, and/or the optional length calculator 310, the element retriever 320 and the optional index determiner 330 of FIG. 14, and/or the mapping unit 410, the information determiner 420, the encoding unit 430 and the associating unit 440 of FIG. 15, and/or the relationship determiner 510, the flag determiner 520 and the associating unit 530 of FIG. 16, and/or the number syntax element determiner 610, the reference syntax element determiner 620 and the associating unit 630 of FIG. 17.

The computer program 730 may be stored in whole or part, on or in one or more suitable volatile computer readable media or data storage means 720, such as RAM, or one or more non-volatile computer readable media or data storage means, such as magnetic disks, CD-ROMs, DVD disks, hard discs, in ROM or flash memory. The data storage means 720 can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the network node include single instruction multiple data (SIMD) code.

The reference number 700 in FIG. 18, thus, indicates the decoder, encoder or device of FIGS. 12-17 as implemented at least partly in software.

The decoder 100 of FIG. 12, the device 200 for determining decoding relationship in FIG. 13 and/or the device 300 for determining decoding relationship in FIG. 14 can advantageously be arranged in a user device or terminal 53 as shown in FIG. 19. This user device 53 could then represent a set-top-box, a computer, a mobile device, such as mobile telephone, laptop or tablet computer, etc. The device 200 of FIG. 13 or the device of 300 of FIG. 14 is advantageously implemented in the decoder 100 of FIG. 12.

The user device 53 may, in addition to a decoder 54, such as a decoder 100 shown in FIG. 12 or another decoder comprising a device 200 of FIG. 13 or a device 300 of FIG. 14, comprise a decoded picture buffer (DPB) 55, in which the user device 53 stores decoded pictures as generated by the decoder 54. These decoded pictures are temporarily stored in the DPB 55 i) to be used as reference pictures when decoding subsequent, according to the decoding order, pictures of the multi-layer video stream and/or ii) until they are output, such as output for display on a display 56 or screen of or connected to the user device 53.

The decoder 100 of FIG. 12, the device 200 for determining decoding relationship in FIG. 13 and/or the device 300 for determining decoding relationship in FIG. 14 may, also or alternatively, be implemented in a network node 52 or network element. In such a case, the network node 52 or network element could perform, e.g. selective forwarding of layers of the coded multi-layer video stream, based on and thereby considering the layer dependencies.

The encoder 400 of FIG. 15, the device 500 for determining coding relationship in FIG. 16 and/or the device 600 for determining coding relationship in FIG. 17 can advantageously be arranged in a user device or terminal 50 as shown in FIG. 19. This user device 50 could then represent a video camera, a computer, a mobile device, such as mobile telephone, laptop or tablet computer, etc. The device 500 of FIG. 16 or the device of 600 of FIG. 17 is advantageously implemented in the encoder 400 of FIG. 15.

The encoder 51 implemented in the user device 50 could be the encoder 400 shown in FIG. 15 or another encoder comprising a device 500 of FIG. 16 or a device 600 of FIG. 17.

Pictures 20, 22, 24 of multiple layers 10, 12, 14 in a multi-layer video stream 1 are input to the encoder 51 of the user device 50 to generate and output a coded multi-layer video stream 2, typically comprising NAL units containing respective encoded representations of the slices in the pictures or parameter sets generated for the multi-layer video stream 1.

The coded multi-layer video stream 2 is preferably transmitted, wirelessly or using a wired connection, from the user device 50 towards the user device 53, where the decoder 54 decodes the coded multi-layer video stream 2 to generate decoded pictures that can be shown on the display 56. Non-limiting examples of transport protocols that could be used in a network in order to transmit a coded multi-layer video stream 2 and/or data packets carrying NAL units that are sent out-of-band include RTP, Dynamic Adaptive Streaming over the Hypertext Transfer Protocol (DASH), MPEG2 Transport Stream (TS). The network is preferably a wireless network, such as a mobile (broadband) network.

The coded multi-layer video stream 2 may be transmitted from the encoding user device 50 to the decoding user device 53 through one or more network nodes 52. Such a network node 52 could optionally process the coded multi-layer video stream 2, such as transcode the multi-layer video stream, or remove one or more layers of the coded multi-layer video stream 2 to form a coded multi-layer video sub-stream 3. Such a layer discarding could be due to bit rate adaptation, e.g. in the case of network congestion; format adaptation, e.g. in the case the decoding user device 53 can only decode or display a certain maximum resolution; or 2D/3D adaptation, e.g. in the case the decoding user device 53 can only decode or display a certain number of views.

The present embodiments are in particular applicable to HEVC and other video coding standards that are capable of coding and decoding multi-layer video, such as multi-view video, 3D video or scalable video.

Modifications and other variants of the described embodiments will come to mind to one skilled in the art having the benefit of the teachings presented in the foregoing descriptions and the associated drawings. Therefore, it is to be understood that the embodiments are not to be limited to the specific examples disclosed and that modifications and other variants are intended to be included within the scope of this disclosure. In particular, embodiments as disclosed herein may be combined where technically feasible.

The invention claimed is:

1. A method, in a processing circuit, of decoding a digitally coded multi-layer video stream defining multiple layers of pictures, each layer of said multiple layers having a respective layer identifier, said method comprising:
  retrieving, for a layer with a layer index of said multiple layers, decoding relationship information based on said digitally coded multi-layer video stream, said decoding relationship information defining a respective layer index of each reference layer of said multiple layers on which said layer directly depends;
  mapping, for each reference layer and for said layer, its layer index to a layer identifier based on mapping information of a hierarchical mapping relationship between layer identifiers and layer indices, wherein said mapping information is retrieved based on said digitally coded multi-layer video stream; and
  decoding a picture of said layer based on at least one previously decoded picture in a layer of said multiple layers identified based on said layer identifiers mapped from layer indices;
wherein said mapping, for each reference layer and for said layer, comprises:
  retrieving a flag vps_nuh_layer_id_present_flag based on said coded multi-layer video stream;
  setting, for each reference layer and for said layer and if vps_nuh_layer_id_present_flag=0, its layer identifier equal to its layer index; and
  retrieving, for each reference layer and for said layer and if vps_nuh_layer_id_present_flag=1, its layer identifier from a vector layer_id_in_nuh[i], i∈[1, vps_max_layers_minus1], wherein vps_max_layers_minus1+1 indicates a maximum number of layers and layer_id_in_nuh[i] indicates a layer identifier for a layer with layer index i.

2. The method of claim 1, wherein retrieving decoding relationship information comprises:
  retrieving, based on said coded multi-layer video stream, at least one direct decoding flag indicating a direct coding relationship between a layer with layer index i of said multiple layers and a layer with layer index j of said multiple layers, where i is not equal to j; and
  determining said decoding relationship information based on said at least one direct decoding flag.

3. A decoder device configured to decode a coded multi-layer video stream defining multiple layers of pictures, each layer of said multiple layers having a respective layer identifier, said decoder comprising:
  a decoding relationship information retriever configured to retrieve, for a layer with a layer index of said multiple layers, decoding relationship information based on said coded multi-layer video stream, said decoding relationship information defining a respective layer index of each reference layer of said multiple layers on which said layer directly depends;
  an index-to-identifier mapping unit configured to map, for each reference layer and for said layer, its layer index to a layer identifier based on mapping information of a hierarchical mapping relationship between layer identifiers and layer indices, said mapping information is retrieved based on said coded multi-layer video stream; and
  a decoding unit configured to decode a picture of said layer based on at least one previously decoded picture in a layer of said multiple layers identified based on said layer identifiers mapped from layer indices;
wherein said index-to-identifier mapping unit is configured to a) retrieve a flag vps_nuh_layer_id_present_flag based on said coded multi-layer video stream; b) set, for each reference layer and for said layer and if vps_nuh_layer_id_present_flag=0, its layer identifier equal to its layer index; and c) retrieve, for each reference layer and for said layer and if vps_nuh_layer_id_present_flag=1, its layer identifier from a vector layer_id_in_nuh[i], i∈[1, vps_max_layers_minus1], wherein vps_max_layers_minus1+1 indicates a maximum number of layers and layer_id_in_nuh[i] indicates a layer identifier for a layer with layer index i.

4. The decoder device of claim 3, wherein said decoding relationship information retriever comprises:
  a flag retriever configured to retrieve, based on said coded multi-layer video stream, at least one direct decoding flag indicating a direct coding relationship between a layer with layer index i of said multiple layers and a layer with layer index j of said multiple layers, where i is not equal to j; and
  an information determiner configured to determine said decoding relationship information based on said at least one direct decoding flag.

5. A decoder device configured to decode a coded multi-layer video stream defining multiple layers of pictures, each layer of said multiple layers having a respective layer identifier, said decoder comprising a non-transitory computer readable medium and an associated processor configured to process computer program instructions stored in the computer readable medium, wherein the stored computer program instructions, when run on said processor, are configured to cause the processor to:
  retrieve, for a layer with a layer index of said multiple layers, decoding relationship information based on said coded multi-layer video stream, said decoding relationship information defining a respective layer index of each reference layer of said multiple layers on which said layer directly depends;

map, for each reference layer and for said layer, its layer index to a layer identifier based on mapping information of a hierarchical mapping relationship between layer identifiers and layer indices, said mapping information is retrieved based on said coded multi-layer video stream; and decode a picture of said layer based on at least one previously decoded picture in a layer of said multiple layers identified based on said layer identifiers mapped from layer indices;

wherein the processor is configured perform said mapping by: a) retrieving a flag vps_nuh_layer_id_present_flag based on said coded multi-layer video stream; b) setting, for each reference layer and for said layer and if vps_nuh_layer_id_present_flag=0, its layer identifier equal to its layer index; and c) retrieving, for each reference layer and for said layer and if vps_nuh_layer_id_present_flag=1, its layer identifier from a vector layer_id_in_nuh[i], i∈[1, vps_max_layers_minus1], wherein vps_max_layers_minus1+1 indicates a maximum number of layers and layer_id_in_nuh[i] indicates a layer identifier for a layer with layer index i.

* * * * *

UNITED STATES PATENT AND TRADEMARK OFFICE
CERTIFICATE OF CORRECTION

PATENT NO. : 10,805,605 B2
APPLICATION NO. : 13/977936
DATED : October 13, 2020
INVENTOR(S) : Thomas Rusert Page 1 of 2

It is certified that error appears in the above-identified patent and that said Letters Patent is hereby corrected as shown below:

On the Title Page

Item (74), under "Attorney, Agent, or Firm", in Column 2, Lines 1-2, delete "Murphy Bilak & Homiller, PLLC" and insert -- Murphy, Bilak & Homiller, PLLC --, therefor.

In the Specification

In Column 1, Line 43, delete "if bit" and insert -- of bit --, therefor.

In Column 6, Line 67, delete "according to above above and a" and insert -- according to above and/or a --, therefor.

In Column 12, Line 57, delete "usage a" and insert -- usage of a --, therefor.

In Column 16, Line 42, delete "form a" and insert -- from a --, therefor.

In Column 17, Line 65, delete "$\text{sum}_{j+1\ldots imax}(x(j))$" and insert -- $\text{sum}_{j=i+1\ldots imax}(x(j))$ --, therefor.

In Column 21, Line 4, delete "independent on" and insert -- independent of --, therefor.

In Column 22, Line 15, delete "layer index directly" and insert -- layer index i directly --, therefor.

In Column 24, Line 24, delete "S60 and 651" and insert -- S60 and S61 --, therefor.

In Column 28, Line 23, delete "embodiment a" and insert -- embodiment of a --, therefor.

In Column 28, Line 49, delete "steam" and insert -- stream --, therefor.

In Column 29, Line 54, delete "embodiment a" and insert -- embodiment of a --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,805,605 B2

In Column 30, Line 31, delete "embodiment a" and insert -- embodiment of a --, therefor.

In Column 31, Line 16, delete "embodiment a" and insert -- embodiment of a --, therefor.

In Column 32, Line 19, delete "device of 300 of" and insert -- device 300 of --, therefor.

In Column 32, Line 47, delete "device of 600 of" and insert -- device 600 of --, therefor.

In the Claims

In Column 35, Line 11, in Claim 5, delete "configured perform" and insert -- configured to perform --, therefor.